(12) United States Patent
Nell et al.

(10) Patent No.: US 8,851,871 B1
(45) Date of Patent: Oct. 7, 2014

(54) HIGH-TEMPERATURE HIGH-PRESSURE PRESSES (HTHP) PRESSES, SYSTEMS FOR HTHP PRESSES AND RELATED METHODS

(71) Applicant: US Synthetic Corporation, Orem, UT (US)

(72) Inventors: Josh J. Nell, Herriman, UT (US); Derek M. Lontine, Orem, UT (US); Eric T. Johnson, Orem, UT (US); Scott Williams, Payson, UT (US); Tyson D. Bunker, Spanish Fork, UT (US); Kevin C. Bach, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/738,647

(22) Filed: Jan. 10, 2013

(51) Int. Cl.
*B30B 15/02* (2006.01)
*B30B 15/30* (2006.01)
*B01J 3/06* (2006.01)

(52) U.S. Cl.
CPC .............. *B30B 15/30* (2013.01); *B30B 15/028* (2013.01); *B01J 3/067* (2013.01); *B01J 3/065* (2013.01)
USPC ............. 425/77; 425/411; 425/395; 425/408; 425/317; 425/472

(58) Field of Classification Search
CPC .......... B30B 15/028; B01J 3/065; B01J 3/067
USPC .................... 425/77, 411, 395, 408, 317, 472
See application file for complete search history.

(56) References Cited

U.S. PATENT DOCUMENTS 3,745,623 A    7/1973  Wentorf, Jr. et al.
2008/0193580 A1*  8/2008  Hall et al. ....................... 425/77

FOREIGN PATENT DOCUMENTS

WO    WO 2012/084215 A1 *  6/2012    .............. B30B 11/16

OTHER PUBLICATIONS

U.S. Appl. No. 12/916,018, filed Oct. 29, 2010, entitled Reinforced Press Base, Piston Cavity Sleeve, and Method of Reinforcing a Press Base (24 pgs).
U.S. Appl. No. 12/916,064, filed Oct. 29, 2010, entitled High Pressure Press with Tensioning Assembly and Related Methods (25 pgs).
U.S. Appl. No. 12/916,097, filed Oct. 29, 2010 entitled Reinforced Press Base, Strengthening Ring, and Method of Reinforcing a Press Base (20 pgs).
U.S. Appl. No. 12/916,130, filed Oct. 29, 2010, entitled High Pressure Press and Method of Making the Same (30 pgs).

* cited by examiner

*Primary Examiner* — Joseph S Del Sole
*Assistant Examiner* — Lawrence D Hohenbrink, Jr.
(74) *Attorney, Agent, or Firm* — Holland & Hart LLP

(57) ABSTRACT

A press, an automated loading system for a press and related methods are provided including a loading system having a first assembly configured to carry a reaction cell to an anvil of a press base and a second assembly configured to assist in positioning and orientating the reaction cell on the anvil. In one embodiment, the first assembly may include a trolley displaceable along a guide member to carry the reaction cell to the anvil. The first and second assemblies may each include guide members that are displaceable relative to the anvil that are configured to position the reaction cell at a desired location and orientation on the anvil. In one embodiment, each of the guide members include arms that engage distinct sides of a cubic reaction cell. A clearing mechanism may also be incorporated to clear the surface of the anvil during operation of the system.

21 Claims, 23 Drawing Sheets

HIGH-TEMPERATURE HIGH-PRESSURE PRESSES (HTHP) PRESSES, SYSTEMS FOR HTHP PRESSES AND RELATED METHODS

TECHNICAL FIELD

The present invention relates to high-temperature, high-pressure presses including systems for loading cubes to be pressed thereby and related methods.

BACKGROUND

High pressure presses have been used for decades in the manufacture of synthetic diamond. Such presses are capable of exerting a high pressure and high temperature on a volume of carbonaceous material to create conditions for sintering polycrystalline diamond. Known designs for high pressure presses include, but are not limited to, the belt press, the tetrahedral press, and the cubic press.

FIG. 1 shows a design for a conventional cubic press 10 known in the art. The design generally includes six press bases 12, with each press base 12 facing towards a common central point 14. The press bases 12 may include a body that exhibits a generally conical shape, with an outer surface 16 and an inner surface 18. The inner surface 18 houses a piston 20, which is capable of being displaced towards the central point 14. Tie bars 28 may extend between and be coupled to individual press bases 12 to form a structural framework that supports the press bases 12 during operation of the press 10.

FIG. 2 shows a close-up view of various components surrounding the central point 14 of the cubic press 10. Guide pins 22 help to keep the pistons 20 aligned as they move in and out of the press bases 12. An anvil 24 is coupled to each of pistons 20 and may include an engagement surface 26 aligned perpendicularly to the axis of motion of the piston 20. The engagement surfaces 26 of the anvils 24 collectively converge upon a defined cube-shaped volume disposed about the central point 14. This volume may be occupied with a cube-shaped reaction cell containing materials that are to be converted to synthetic diamond. During operation of the press 10, the square anvil surfaces 26 apply pressure and heat to the reaction cell to create the necessary conditions within the reaction cell for forming synthetic diamond. An example of the process that takes place in forming synthetic diamond under HTHP conditions is described in U.S. Pat. No. 3,745,623 to Wentorf, Jr. et al., the disclosure of which is incorporated by reference herein. Examples of some cubic presses and related components used in HTHP processes may be found in U.S. patent application Ser. No. 12/916,018 filed on Oct. 29, 2010, U.S. patent application Ser. No. 12/916,064 filed on Oct. 29, 2010, U.S. patent application Ser. No. 12/916,097 filed on Oct. 29, 2010 and U.S. patent application Ser. No. 12/916,130 filed on Oct. 29, 2010, the disclosures of each of which are incorporated by reference herein in their entireties.

In the operation of conventional presses, the reaction cell is conventionally placed on an anvil 24 (i.e., on the lowermost anvil of the press) by an operator of the press. Typically, to ensure correct positioning of the reaction cell, the operator uses a spacer or a template structure configured to help place the reaction cell at a specified position on the supporting anvil and in a predetermined orientation with respect to one or more of the anvils 24. Positioning of the reaction cell by hand, even when using precision templates or spacers, often results in inconsistencies in the placement of the reaction cell relative to each of the anvils 24. For example, the pistons may have variation in their positioning when they return to a "rest" state from one cycle to another, thereby making the method of using a template inaccurate. Additionally, human error inevitably impacts the placement of a reaction cell regardless of how careful an operator is.

Improper placement of the reaction cell can affect the operations of the press and, importantly, affect the quality of the synthetic diamond material being produced. Furthermore, in order to properly position the reaction cell, an operator has to position their body between adjacent press bases and reach in towards the anvils. This can be difficult from an ergonomic standpoint and can also be a safety hazard in certain situations. Additionally, hand placement and alignment of the reaction cell is not a particularly fast process and may be a limiting factor in the production efficiency of synthetic diamond or other superabrasive compacts.

It is a desire within the industry to continually improve the process of fabricating synthetic diamond and other superabrasive compacts, including providing methods, components and systems that, among other things, may help to improve the safe conditions of workers, improve the consistent quality of the work product, and improve the efficiency of the manufacturing process.

BRIEF SUMMARY OF THE INVENTION

In accordance with the present invention, embodiments of a high-temperature, high-pressure (HTHP) press, a loading system, and related methods are provided. In accordance with one embodiment, an automated loading system for a HTHP press is provided. The system includes a first assembly comprising a support member, a trolley displaceable relative to the support member and a positioning mechanism coupled with the trolley configured to carry a reaction cell. The system further includes a second assembly comprising a bracket, a body portion displaceable relative to the bracket, an alignment guide and a first positioning guide configured to cooperate with the positioning mechanism of the first assembly to position a reaction cell carried by the positioning mechanism at a desired location relative to a defined component of a HTHP press.

In other embodiments, other features and components may be included. For example the first assembly may further include a guide member coupled to the support member, the trolley being slidably coupled with the guide member.

The positioning mechanism may include a base member and a second positioning guide movably coupled with the base member. The first positioning guide may include a pair of guide arms configured to engage two distinct sides of a cubic reaction cell while the second positioning guide may also include a pair of guide arms configured to engage two other distinct sides of a cubic reaction cell.

In one embodiment, a first actuator may be configured to displace the trolley along the guide member and a second actuator may be configured to displace the second positioning guide relative to the base member.

The second assembly may comprise a pair of arms pivotally coupled between the bracket and the body portion to form a multiple bar linkage. A third actuator or a dyad is configured to displace the pair of arms between at least two different positions.

The loading system may also include a clearing mechanism associated with the second assembly. In one embodiment, the clearing mechanism includes a sweeper and another actuator configured to displace the sweeper between at least two positions relative to the body portion of the second assembly.

The loading system may include a coupling assembly configured to couple the support member of the first assembly to a component of a HTHP press such as a press base or a piston. In one embodiment the coupling assembly includes a first body portion coupled with the support member and a second body portion configured to be coupled with a component of a HTHP press such as a press base or a piston. One of the first body portion and the second body portion may include a latching member and the other of the first body portion and the second body portion may include a pin to be engaged by the latching member. Additionally the first body portion may include a first engagement structure and the second body portion may include a second engagement structure sized and configured to mate with the first engagement structure.

In accordance with another embodiment of the invention, a high-temperature, high-pressure press is provided. The HTHP press includes a first press base having a piston and an anvil coupled with the piston and an automated loading system. The automated loading system includes a first assembly and a second assembly associated with the first press base. The first assembly includes a support member, a trolley displaceable relative to the support member and a positioning mechanism coupled with the trolley configured to carry a reaction cell to the anvil of the first press base. The second assembly includes a bracket coupled with the first press base, a body portion displaceable relative to the bracket, an alignment guide configured to engage a surface of the anvil and a first positioning guide configured to cooperate with the positioning mechanism of the first assembly to position a reaction cell at a desired location on the anvil.

The press may also include any of the various features or components described herein with respect to the loading system. In one particular embodiment, the press may be configured as a cubic press having six press bases.

In accordance with a further embodiment of the invention, a method of operating a high-pressure, high-temperature press is provided. The method includes positioning a reaction cell on a first assembly of a loading system. The reaction cell is carried on a trolley of the first assembly to a location adjacent an anvil of a press base of the HTHP press. A first guide member associated with a second assembly is positioned at a desired location relative to the anvil and the reaction cell is placed on the anvil in a desired position and orientation by engaging the reaction cell with the first guide member and with a second guide member associated with the first assembly. The first guide member and the second guide member are retracted while leaving the reaction cell on the anvil and the reaction cell is subject to a HTHP process.

In one embodiment, the method includes actuating a clearing mechanism associated with the second assembly to remove the reaction cell subsequent the HTHP process. In another embodiment, the method includes actuating a clearing mechanism associated with the second assembly to sweep a surface of the anvil prior to placing the reaction cell on the anvil.

Features, aspects and acts of any of the various embodiments described herein may be combined, without limitation, with other described embodiments.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
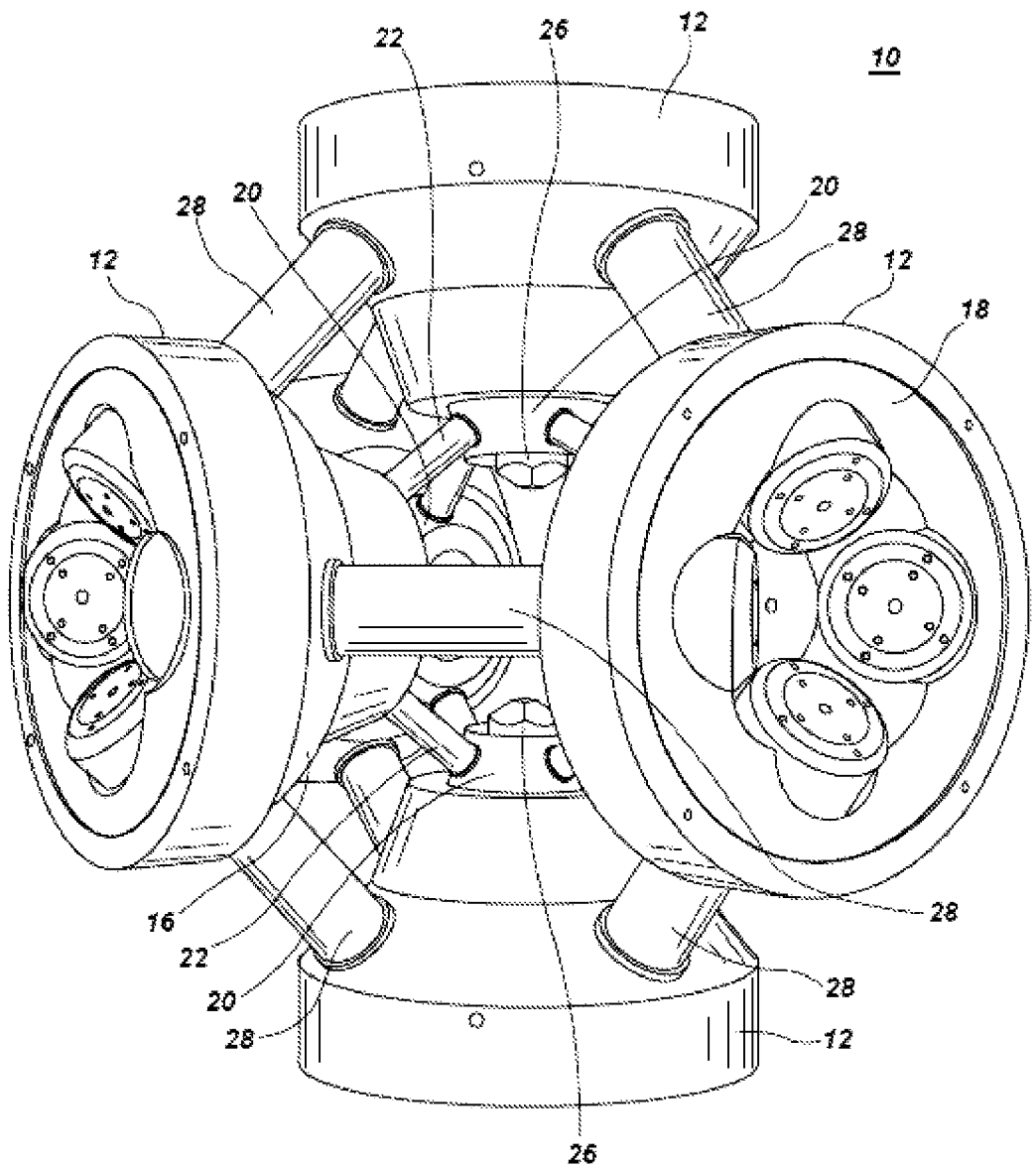
FIG. 1 is a side view of a cubic press.
Figure 2:
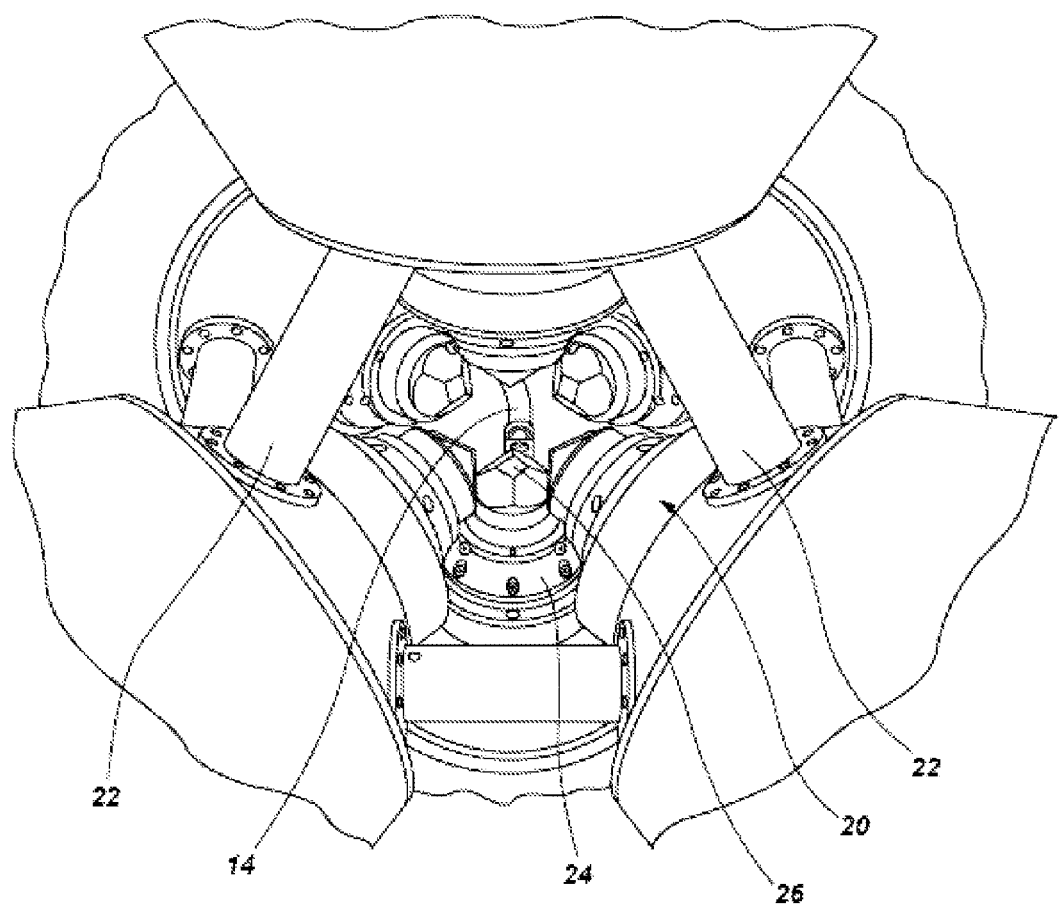
FIG. 2 is a detailed view of certain components of the press shown in FIG. 1.
Figure 3:
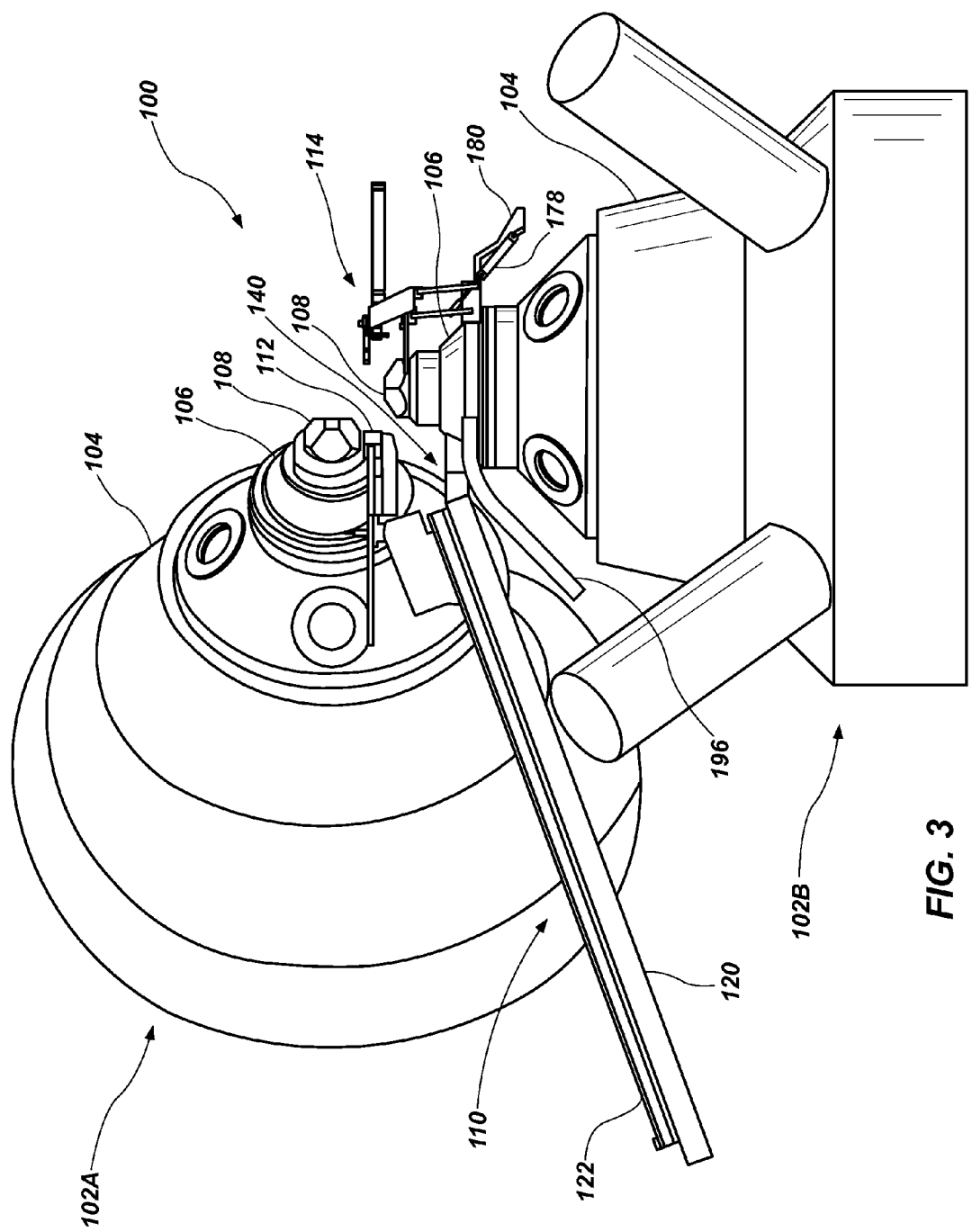
FIG. 3 shows two press bases of a cubic press and a loading system according to an embodiment of the invention.

Referring to FIG. 3, a loading system 100 for a press is shown and described. While the loading system 100 may be used with a variety of press types, the present description is made with reference to a cubic press. For purposes of clarity and convenience, the entirety of the press is not shown in FIG. 3. Rather, a first press base 102A and a second press base 102B are shown for context while enabling a better view of the loading system 100 and its various components.

Each press base 102A and 102B may include, for example, a body portion 104 which houses a piston 106 having an anvil 108 coupled therewith. The pistons 106 may be cooperatively actuated so that their associated anvils 108 are displaced and converge upon a central point, at which a reaction cell may be positioned. When actuated, the pistons 106 apply pressure to a reaction cell through their associated anvils 108 as part of a high-temperature, high-pressure (HTHP) process for forming polycrystalline diamond or another sintered material. As noted above, with a cubic press, six different press bases would be arranged such that their respective anvils converged to apply pressure on a reaction cell with pressure being applied substantially equally on each side of the reaction cell.

The loading system 100 includes a first assembly 110 configured to carry and place a reaction cell 112 on the face of an anvil (i.e., on the anvil 108 of press base 102B) and a second assembly 114 that helps to correctly position the reaction cell on the anvil 108. The second assembly 114 also ensures that the surface of the anvil is clear of debris or obstacles prior to a reaction cell 112 being positioned thereon, and further assists in removing the reaction cell 112 after it has been subjected to an HTHP process by the press.

Figure 4:
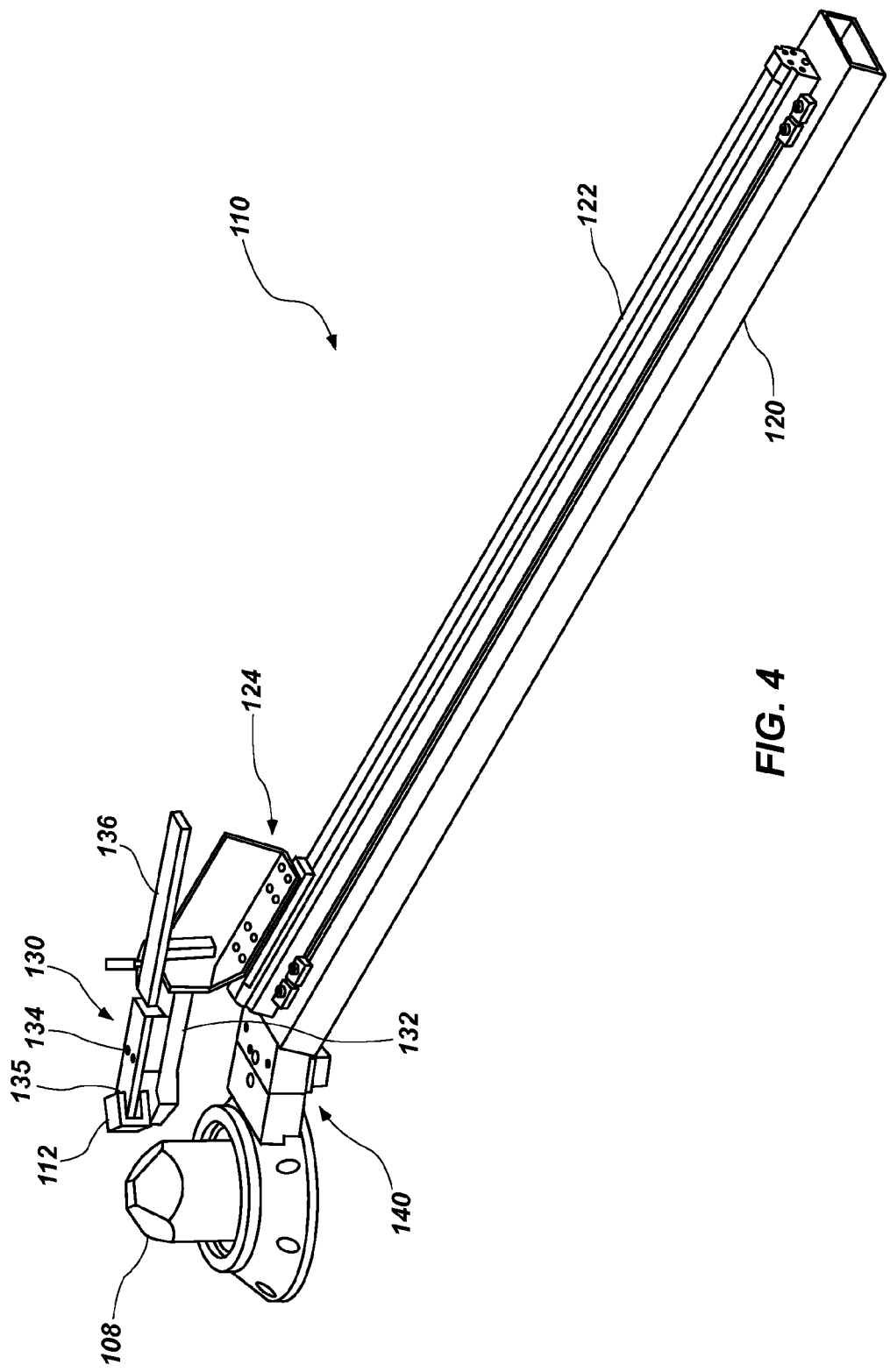
FIG. 4 is a perspective view of certain components of the loading system shown in FIG. 4.
Figure 5:
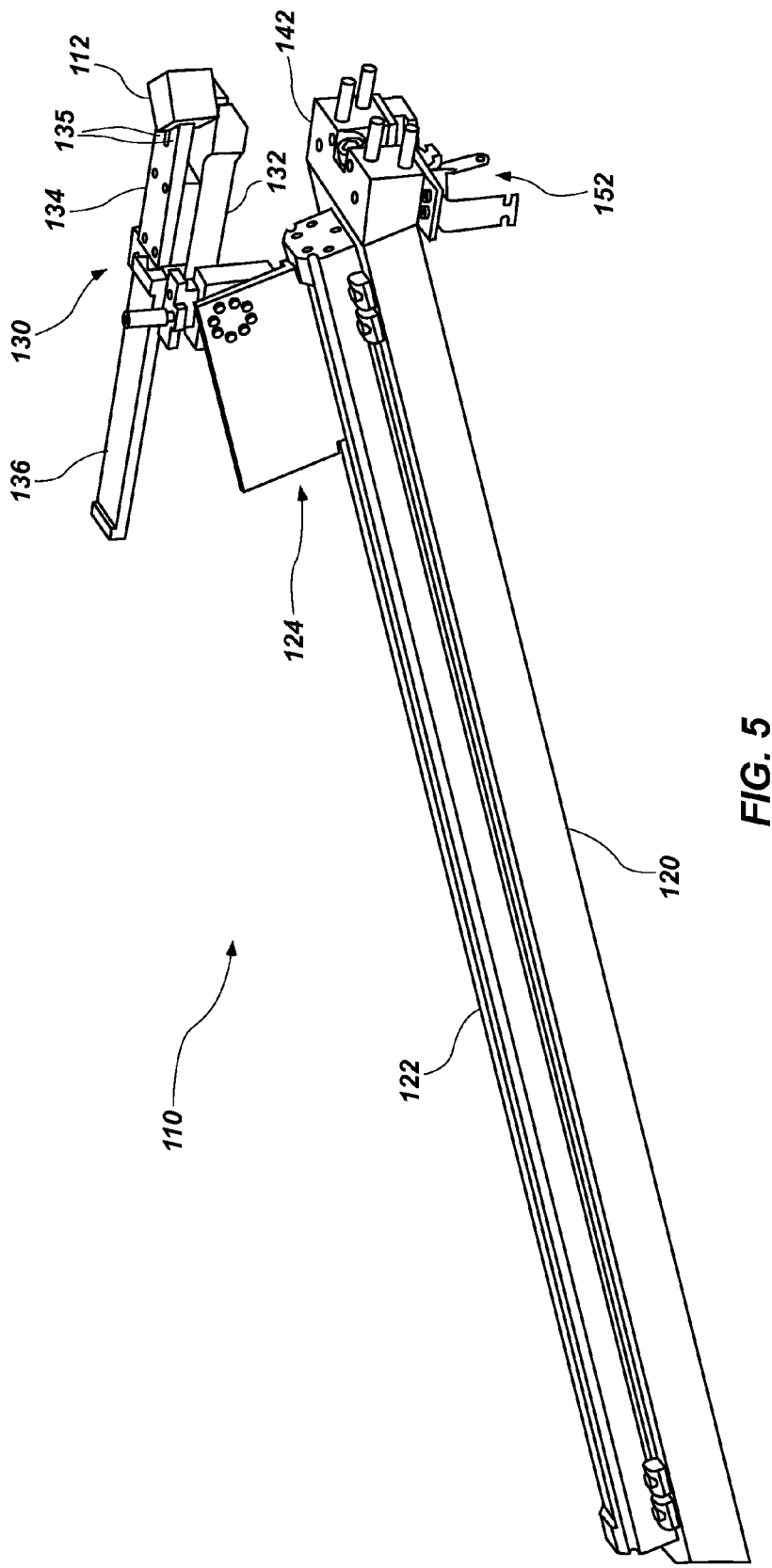
FIG. 5 is another perspective view of the components shown in FIG. 4.
Figure 6A:
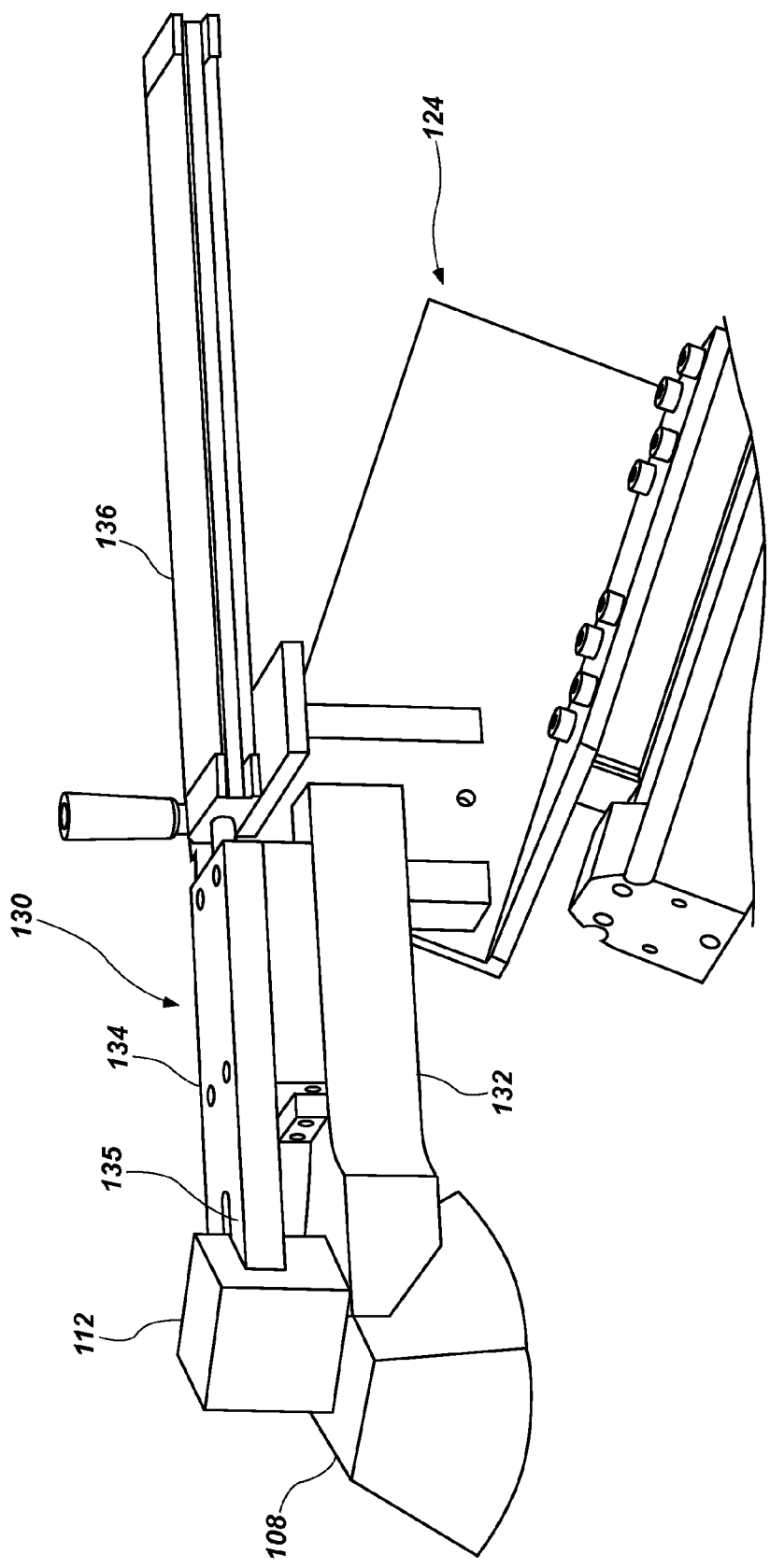
FIG. 6A shows further details of components from the loading system shown in FIGS. 4 and 5.

Referring to FIGS. 4, 5 and 6A in association with FIG. 3, the first assembly 110 may include a beam 120 that supports a rail or guide 122 (in this embodiment, a linear guide). A trolley 124 may be coupled with the linear guide 122, such as by way of a linear bearing, enabling the trolley 124 to be slidably displaced along the linear guide 122 from one end to the other. A variety of mechanisms or actuators may be used to displace the trolley 124 along the linear guide 122. For example, a pneumatic or hydraulic actuator may be used to displace the trolley 124. In another embodiment, the trolley 124 may be driven by a belt or a chain coupled with an appropriate drive motor. In yet another embodiment, the linear guide 122 and the trolley 124 may be configured to act as a linear drive using electromagnets. In a further embodiment, the trolley 124 may be displaced by a screw drive. In yet another embodiment, an electric motor may be coupled to the trolley 124 and configured to engage the linear guide 122 (e.g., by rack and pinion gearing) to position the trolley 124 along the linear guide 122.

Attached to the trolley 124 is a positioning mechanism 130 that includes a base member 132, a positioning guide member 134 and an actuator 136 configured to displace the positioning guide member 134 relative to the base member 132. In one embodiment, the positioning guide member 134 may include a pair of forked arms 135 configured to engage two adjacent sides of a cubic reaction cell while the reaction cell 112 rests upon a surface of the base member 132. As will be discussed in further detail below, the positioning guide member 134 is configured to assist in the placement of the reaction cell on a surface of the anvil 108. The relative displacement of the positioning guide member 134 with respect to the base member 132 may be accomplished by a variety of mechanisms including bearing elements (e.g., ball bearings or roller bearings), an interface surface with reduced friction (e.g., Teflon) positioned between the two components or other dry contact materials as will be appreciated by those of ordinary skill in the art.

Figure 6B:
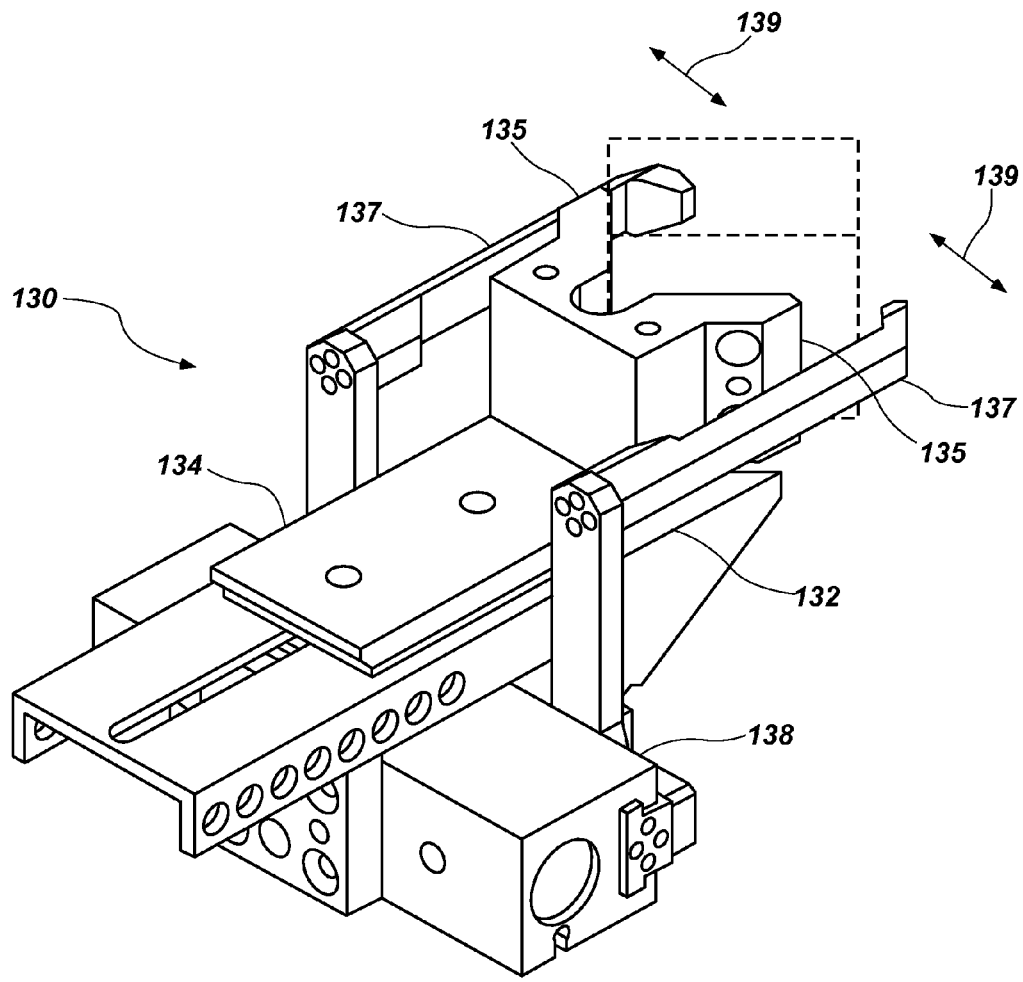
FIG. 6B shows another embodiment of the components shown in FIG. 6A.

Referring to FIG. 6B, another embodiment is shown of the positioning mechanism 130 that includes a pair of laterally positionable grasping arms 137 adjacent the forked arms 135. The grasping arms 137 may be coupled with an actuator 138 which is configured to displace the grasping arms 137 laterally away from one another and towards one another as indicated generally by directional arrows 139. The grasping arms 137 may be used to affirmatively grasp or hold a reaction cell (shown in dashed lines for reference in FIG. 6B) during transport and placement of the reaction cell. In one embodiment, such grasping arms 137 may be used as a pick-and-place mechanism to acquire the reaction cell from a stock or supply of reaction cells, carry the reaction cell to the anvil of a press base, and subsequently retrieve and dispose of the reaction cell following an HTHP process. The grasping arms 137 and other components (e.g., the positioning guide member 134 and forked arms 135) may be adjustable relative to one another to accommodate various sizes of reaction cells.

Figure 6C:
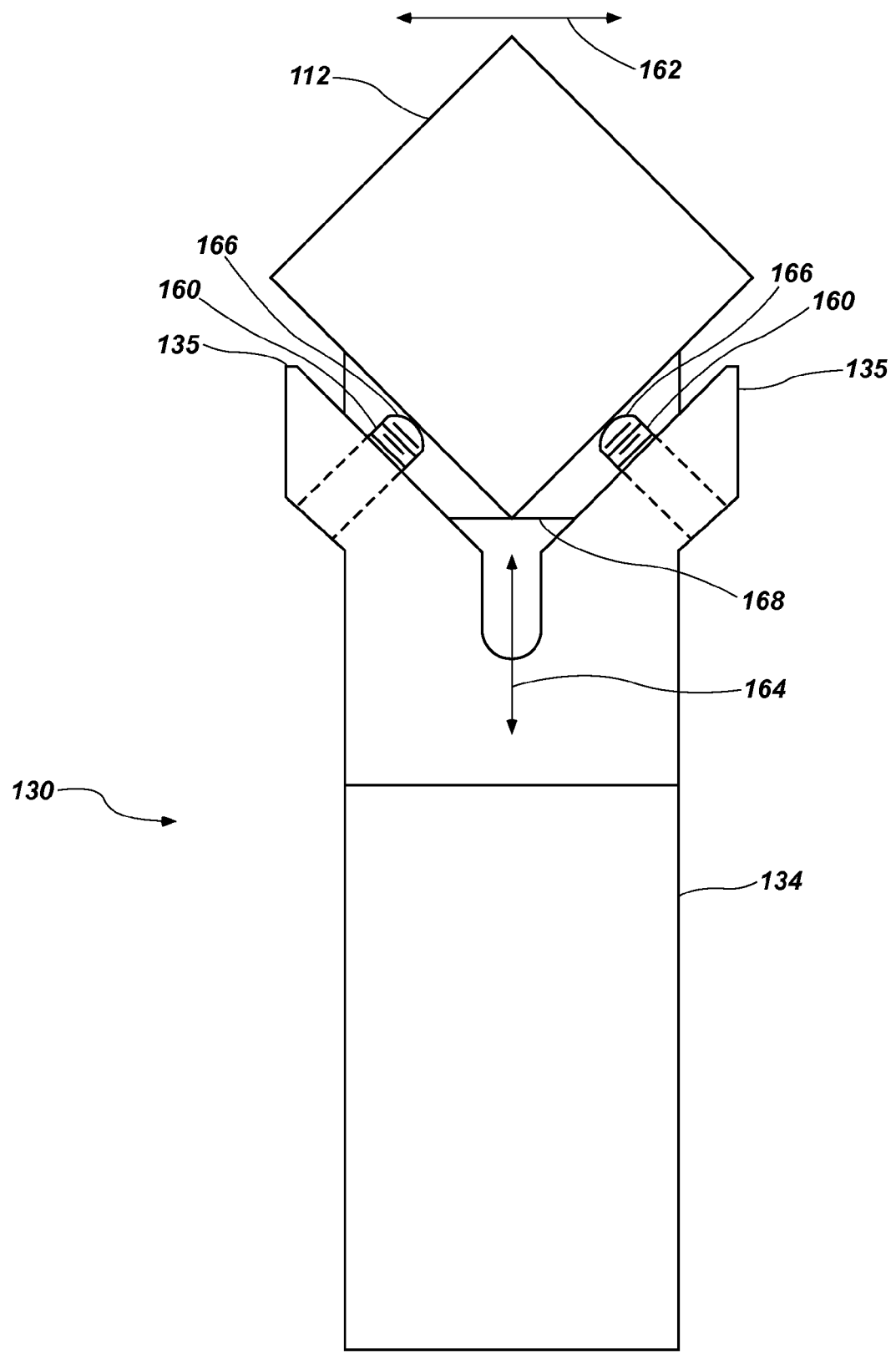
FIG. 6C shows a further embodiment of the components shown in FIG. 6A.
Figure 7:
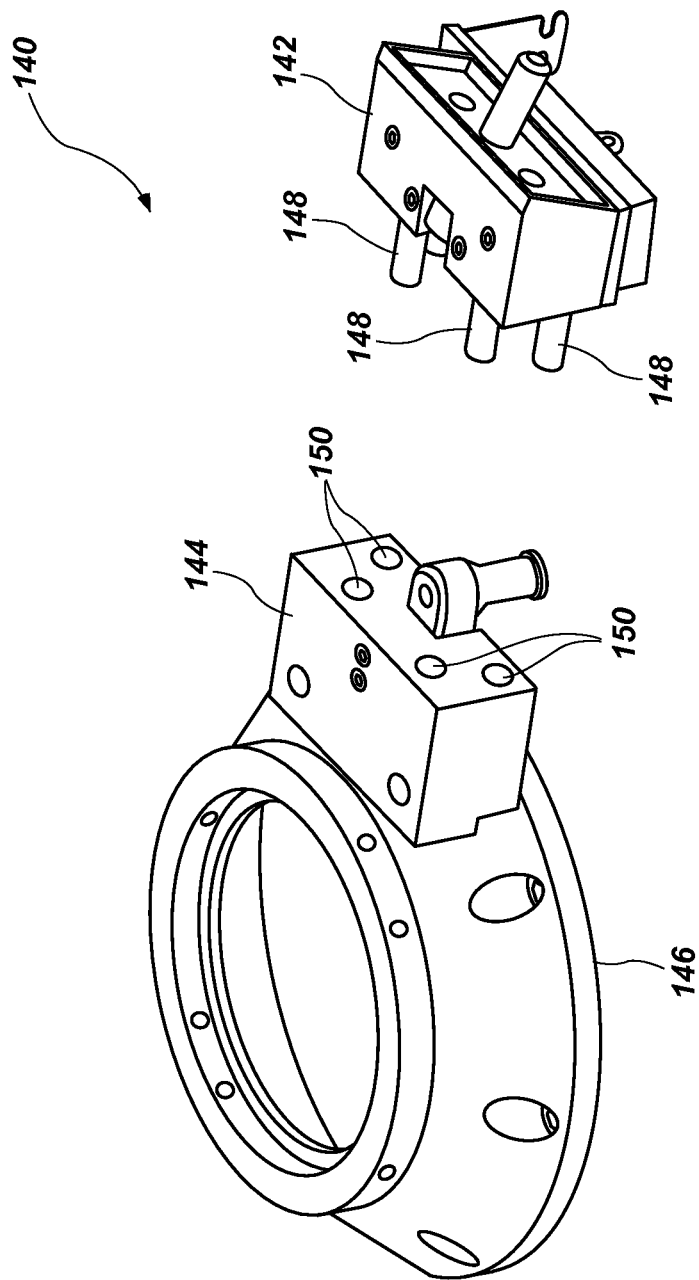
FIG. 7 is a first perspective view of various components used in coupling portions of the loading system with a press base according to an embodiment of the invention.
Figure 8:
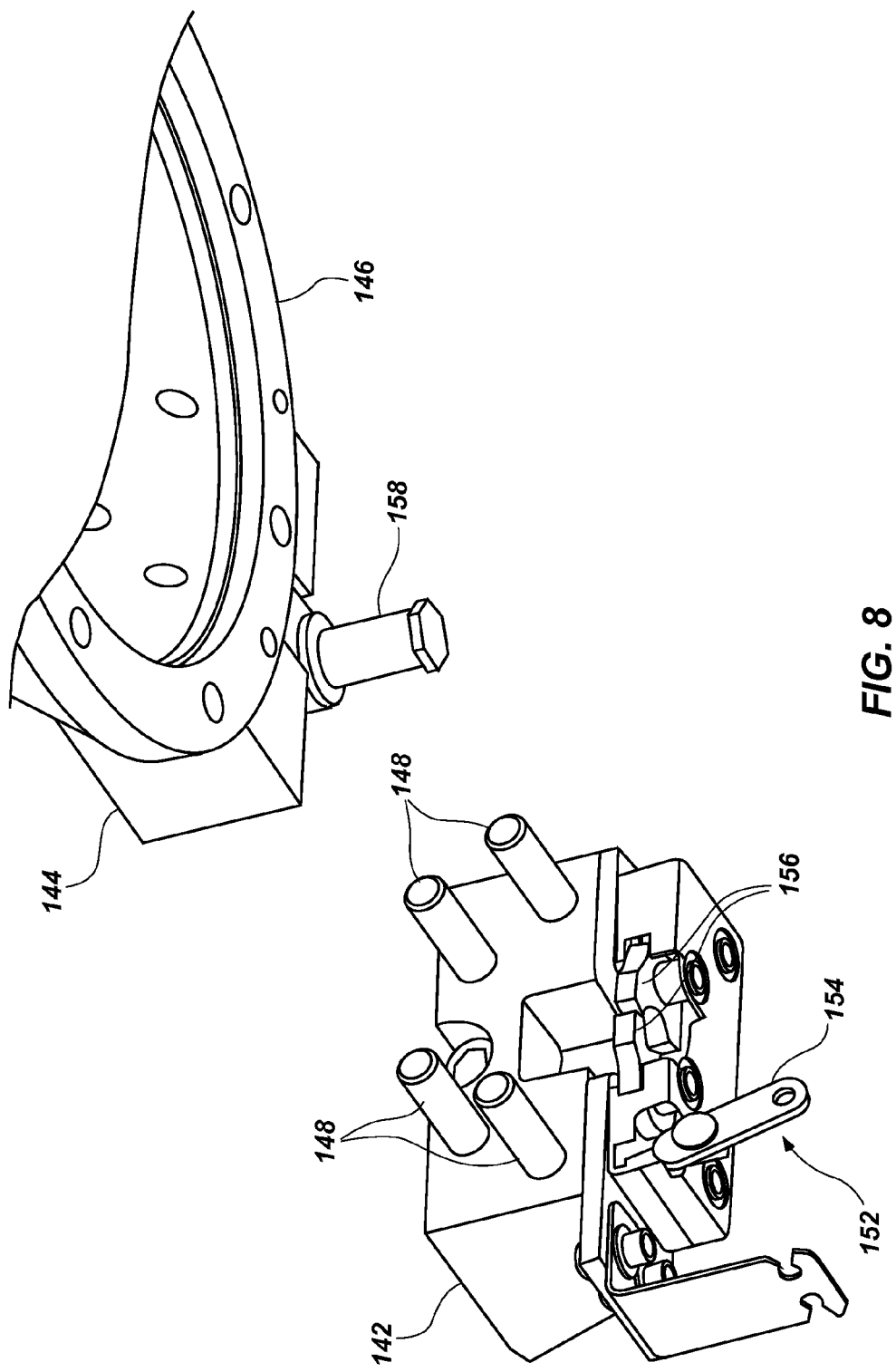
FIG. 8 is another perspective view of the components shown in FIG. 7
Figure 9:
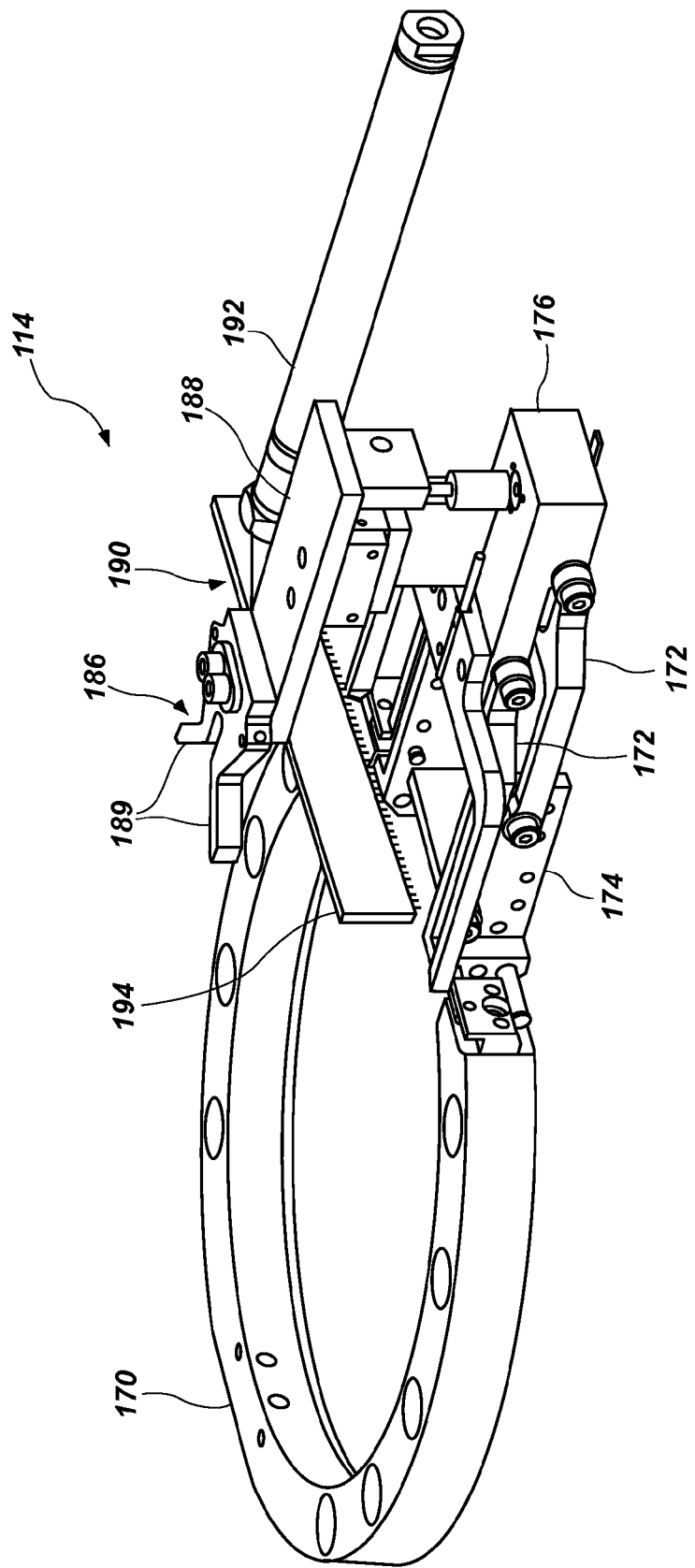
FIG. 9 is a perspective view of additional components of the loading system shown in FIG. 3.
Figure 10:
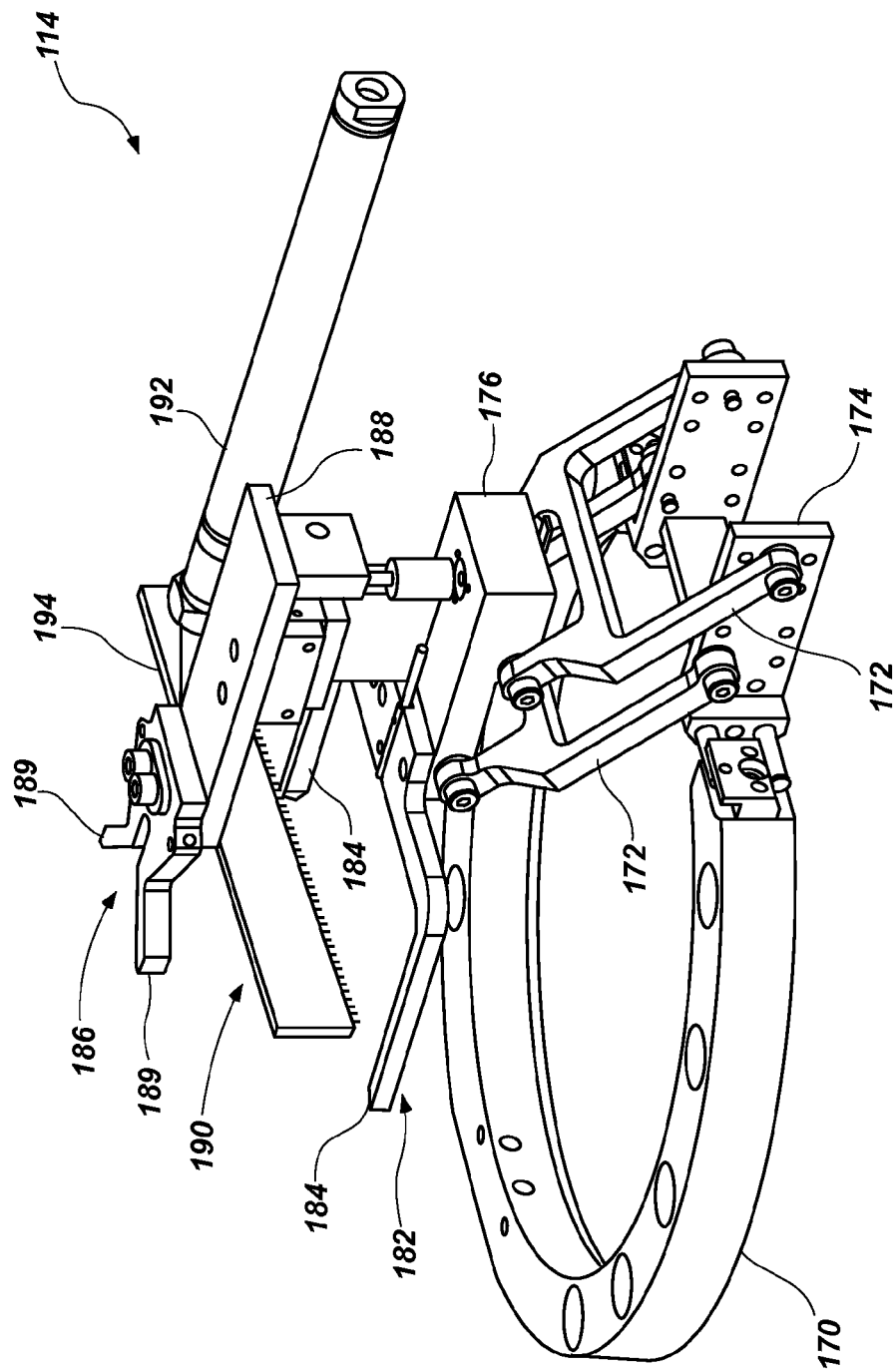
FIG. 10 is another perspective view of the components shown in FIG. 9.
Figure 11:
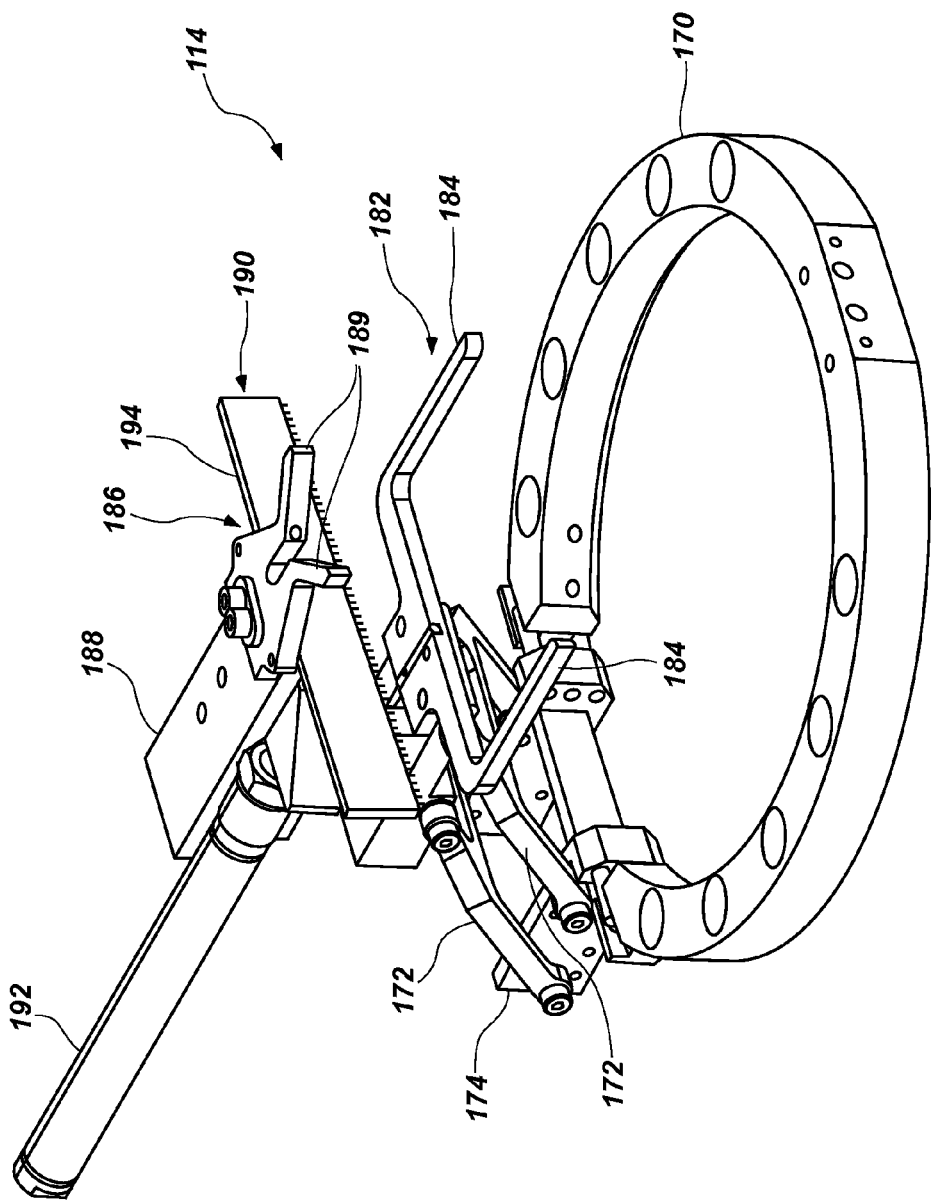
FIG. 11 is a further perspective view of the components shown in FIG. 9.

Referring briefly to FIG. 6C, a further embodiment is shown of the positioning mechanism 130 which includes one or more adjustable alignment structures, in this case a pair of spherical point set screws 160 with one being positioned along the inside face of each forked arm 135. The set screws 160 enable fine adjustment of the position of the reaction cell 112 relative to the positioning guide member 134 and guide arms 135 subsequent attachment of the first assembly 110 to the press. For example, one set screw 160 may be adjusted "out" from the surface of its associated arm 135 (e.g., by way of a threaded coupling with the arm 135) while the other set screw 160 being adjusted "in" to the surface its associated arm 135. This enables the position of the reaction cell 112 to be adjusted laterally towards one arm 135 or the other as indicated by directional arrow 162. Further, both set screws 160 may be adjusted "out" or "in" a similar distance to enable the position of the reaction cell 112 to be adjusted either away from or towards both arms 135 an equal distance (i.e., towards or away from the "V" formed by the forked arms 135 and as indicated by directional arrow 164). Additionally, the spherical end surfaces 166 of the set screws enable a reaction cell 112 to easily slide relative to the forked arms 135 and become seated in a desired position and orientation relative to the forked arms 135 during loading and handling of the reaction cell 112. An adjustable abutment plate 168 may also be positioned in association with the forked arms 135 to act as a third contact point in positioning and orienting the reaction cell 112 while also providing additional fine adjustment capabilities to the positioning mechanism 130 (e.g., in the direction indicated by directional arrow 166). It is noted that, while various embodiments of the positioning mechanism 130 have been shown in FIGS. 6A-6C, such embodiments are not mutually exclusive of one another but, rather, the features shown in FIGS. 6A-6C may be combined without limitation.

In one embodiment, the first assembly 110 may include a quick-connect coupling assembly 140 for coupling with an associated press base 102B. For example, referring to FIGS. 3-5, 7 and 8, the coupling assembly 140 may include a first body member 142 coupled with the beam 120, for example, by way of mechanical fasteners, welding or other appropriate fastening or joining techniques. In another embodiment, the beam 120 and body portion may be formed as an integral component. A second body member 144 is coupled with a flange 146 or other component of the press base 102B (e.g., a flange associated with the piston assembly of the press base 102B). The second body member 144 may likewise be coupled with the flange 146 or other component, for example, by way of mechanical fasteners, welding, other appropriate fastening or joining techniques or it may be integrally formed with such a component.

One or more engagement pins 148 may be associated with the first body member 142 and configured to engage associated holes, apertures or other keyed geometric features (referred to generally herein as apertures 150) to ensure a desired orientation and alignment of the first assembly 110 of the loading system 100 with a press base 102B. Similar features may be used in coupling the first body member 142 with the beam 120 and/or the second body member 144 with the flange 146 or other component if desired. A locking mechanism 152 may also be associated with the first body member 142. For example, a lever 154 or other actuating mechanism may be associated with one or more latching members 156 such that, when assembled with the engagement pins 148 positioned within their associated apertures 150, the lever 154 may be actuated causing the latching members 156 to engage an associated pin 158 or other structure and lock the first body member 142 in position relative to the second body member 144. Such an assembly acts as a quick connect/disconnect system and enables the loading system 100, or portions thereof, to be easily coupled to, and removed from, a press base for replacement, repair or routine maintenance. Additionally, such an assembly provides the ability to easily adapt the present loading system to an existing press without the need to substantially modify a press base or other component of the press. For example, the loading system 100, or various components thereof, may be directly coupled to a piston 106 of a press base and be fully supported by such a connection (e.g., the first assembly 110 being cantilevered therefrom). Of course other coupling mechanisms, including other quick connect/disconnect mechanisms, may be used for coupling the loading system, or any specific assemblies or components thereof, with a press.

Referring now to FIGS. 3 and 9-11, an embodiment of the second assembly 114 of the loading system 100 is shown and described. The second assembly 114 may include a mounting flange 170 that may be coupled with press base 102B. For example, the mounting flange 170 may be coupled with, or take the place of, an existing flange associated with the piston 106 of the press base 102B. A pair of arms 172 is pivotally coupled to the mounting flange by way of an associated bracket. A body portion 176 is pivotally coupled to each of the arms 172 such that the body portion 176, the pair of arms 172 and the bracket 174 work together as a set of mechanical linkages such that the body portion 176 may be displaced along a curved path relative to the bracket 174 and mounting flange 170. This can be seen by comparing FIGS. 9 and 10 where, in FIG. 9, the arms 172 and body portion 176 have been rotated back and generally away from the mounting flange 170, while in FIG. 10 the arms 172 have been rotated up and towards the mounting flange 170. In both positions (i.e., the positions shown in FIGS. 9 and 10), the body portion 176, while being laterally displaced and while also changing its elevational position, maintains a common orientation relative to the mounting flange 170. As seen in FIG. 3, an actuator 178 or a driver dyad may be coupled between one of the arms 172 and a bracket 180 or other structural member. The actuator 178, which may include a pneumatic or hydraulic cylinder (or any of a variety of components such as described above), may be used to position the body portion 176 and associated components relative to an anvil 108 of the press base 102B as will be described in further detail below. It is noted that other mechanisms may be utilized in conjunction with (or in place of) the arms 172 and the actuator 178 to position the body portion 176 and its associated components at a desired position relative to the anvil of a press base 102B. In one example, any of a variety of other linkage arrangements may be used in place of the arms 172. In another example, a linear displacement mechanism, such as used in the first assembly 110, may be used in place of the arms 172 with the body portion 176 being displaced along a linear guide similar to the trolley 124 of the first assembly. Similarly, it is also noted that other mechanisms (such as that which is described with respect to the second assembly 114, for example) may be incorporated into, or be used in place of, the first assembly 110.

A variety of components and mechanisms are coupled with the body portion 176. For example, a guide member 182 is coupled with the body portion and, in one embodiment, may include a pair of spaced apart arms 184. The guide member 182 may be used to help ensure proper alignment and positioning of the various components of the second assembly 114 relative to the anvil 108 of a press base 102B during operation of the loading system 100. For example, the spaced apart arms 184 may be configured to engage the peripheral sides of an anvil when the body portion 176 is rotated into a desired position (e.g., when the body portion 176 is rotated into the position shown in FIGS. 3, 10 and 11. A reaction cell positioning guide 186 may also be coupled to the body portion 176, such as by way of a bracket 188. The positioning guide 186 may be used to help position a reaction cell on an anvil at a desired location and in a desired orientation as will be discussed in further detail below. In one embodiment, the positioning guide 186 may include a pair of forked or angled arms 189 configured to engage adjacent sides of a generally cubic reaction cell.

It is noted that components of the first assembly 110 and the second assembly 114 may be adjustable (e.g., laterally, elevationally, angularly, etc.), and may even include additional components, for purposes of alignment and/or to enable the handling and accurate placement of a variety of different sized reaction cells. For example, in one embodiment, adjustment may be accomplished through control of the first and second assemblies 110 and 114 by providing a reference point relative to the position of the anvil and then tracking or sensing the position of certain components of the first and second assemblies (e.g., through the use of appropriate sensors or encoders) and then comparing them to an intended position of such components based on a desired placement of a reaction cell (in terms of location and orientation) relative to the reference point and in light of the size and shape of the reaction cell being positioned. In another embodiment, in order to accommodate various sizes of reaction cells, the bracket 188 and angled arms 189 may be adjustable relative to the body portion 176 in a direction towards and away from the anvil. For example, relative adjustment of up to 0.5 inches or greater may be used to accommodate different sized reaction cells. Such adjustment may be done by hand, or may be done using additional actuators. In one particular example, a ball screw actuator may be used to automatically adjust the position of the bracket 188 and arms 189 relative to the body portion 176 based on input to the system from an operator or from a computerized controller.

Figure 12:
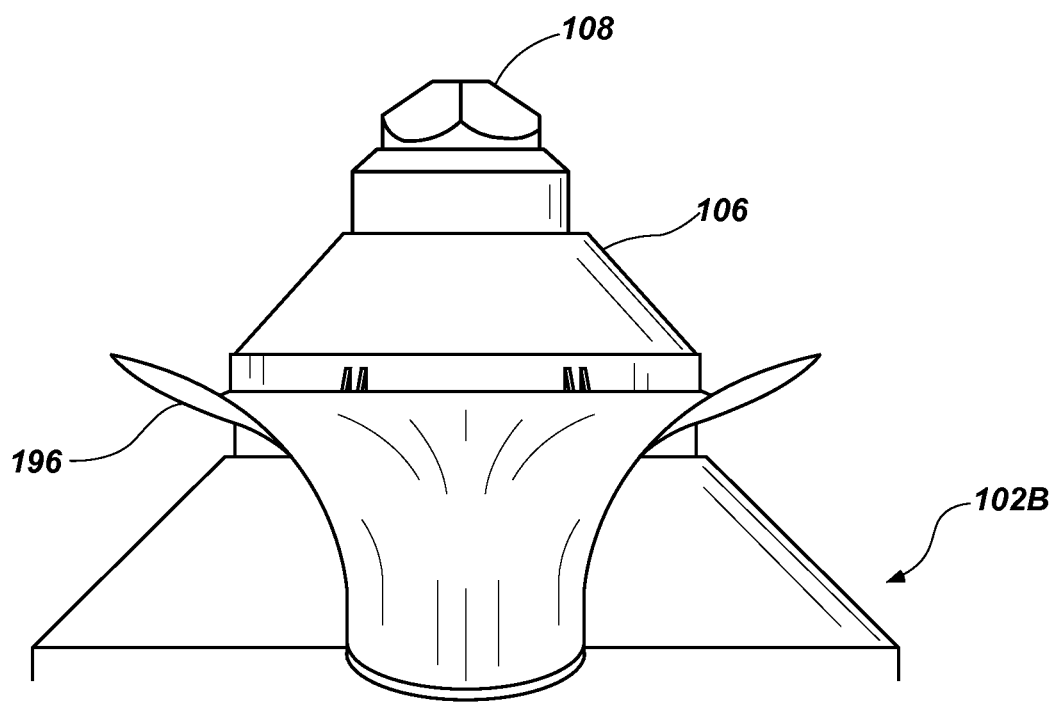
FIG. 12 is a front view of another component associated with the loading system.

A clearing mechanism 190 may also be coupled with or otherwise associated with the body portion 176. The clearing mechanism 190 may include an actuator 192 such as a pneumatic or hydraulic cylinder (or other appropriate mechanism such as set forth above) coupled with a sweeper 194. The sweeper 194 may be configured, for example, as a brush or as a squeegee. As will be discussed below, the clearing mechanism 190 may be used to remove reaction cells from an anvil as well as to ensure that the surface of the anvil is clear of debris or obstructions prior to placing a reaction cell thereon. As shown in FIGS. 3 and 12, a discharge chute 196 may be coupled with the press (e.g., a press base 102B or a piston 106 of a press base) and be configured and oriented to catch any reaction cells 112 that are cleared from the anvil 108 following an HTHP process. The chute 196 may be configured to extend at least partially around the periphery of the press component to which it is mounted. In the embodiment shown, when the clearing mechanism 190 clears a reaction cell 112 from the anvil, it may be discharged in a direction generally towards the first assembly 110 and fall to either side of the rail or linear guide member (not shown in FIG. 12) into the discharge chute 196. The reaction cell 112 may slide down the discharge chute 196 and exit into a collection bin, onto a conveyor belt, or into some other collection mechanism. In one embodiment, the clearing mechanism 190 may be configured to generally direct the reaction cell 112 to one side or the other of the first assembly 110 and into the discharge chute 196. For example, in one embodiment, the sweeper 194 may be displaced in a direction that, while generally towards the first assembly 110, is somewhat to the right or the left of the first assembly 110 so that the reaction cell 112 avoids hitting or landing on the first assembly 110. In another embodiment, the sweeper 194 may be oriented at an angle relative to its direction of displacement, again to bias the reaction cell to one side or the other of the first assembly 110 and enable it to fall into the discharge chute 196.

Figure 13A:
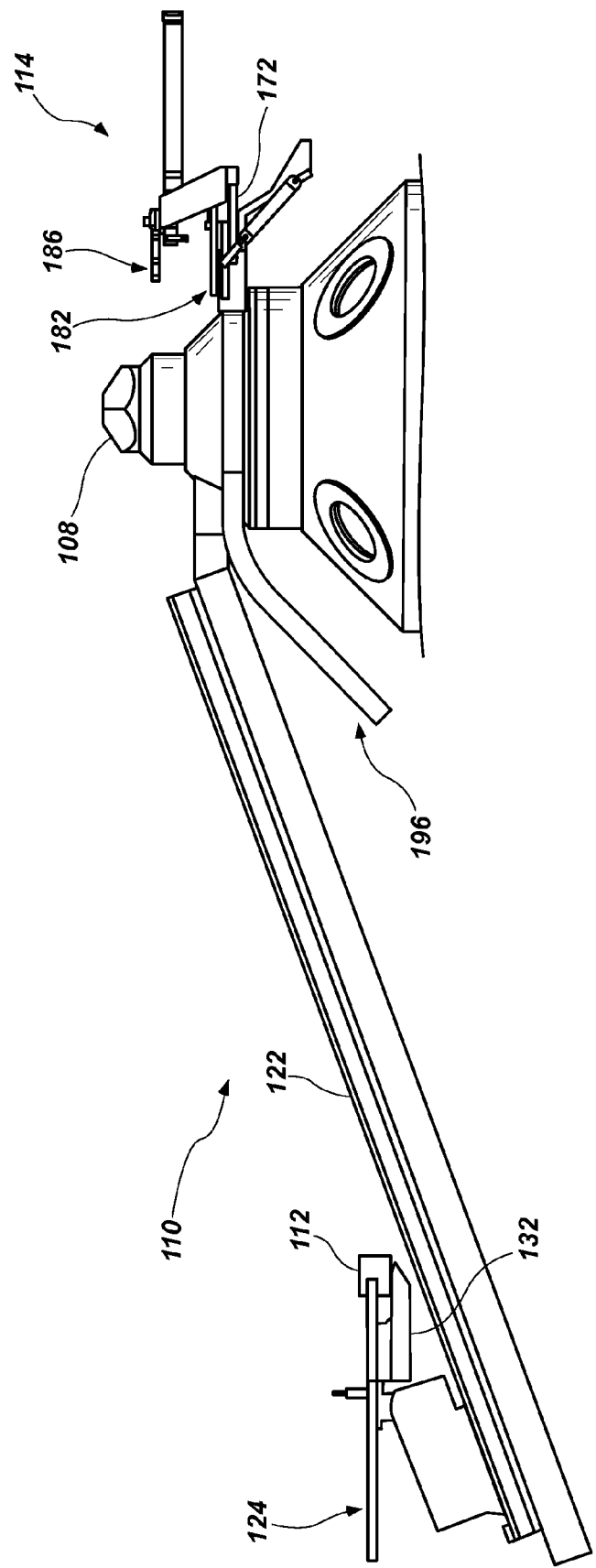
FIGS. 13A-13I show side views of a press base along with various components of the loading system shown in FIG. 3 while in various states of operation.

Referring now to FIGS. 13A-13J, operation of the loading system 100 is described in accordance with one example embodiment. It is noted that FIGS. 13A-13J depict the loading system 100 in association with a single press base 102B, the remainder of the press not being shown for purposes of clarity. Referring first to FIG. 13A, the trolley 124 may be initially positioned near the lower end of the linear guide 122 a distance from the anvil 108. This distance may be sufficient so that the trolley is positioned outside the general footprint (or at least adjacent to its periphery) of the press. Such a configuration provides easy access to the trolley 124 by an operator or by other systems. A reaction cell 112 is positioned on an upper surface of the base member 132. The reaction cell 112 may be positioned by an operator by hand or it may be placed by another system or mechanism if desired. The second assembly 114 is positioned with the arms 172 retracted outward and with the guide member 182 and the positioning guide 186 positioned away from the anvil 108.

Figure 13B:
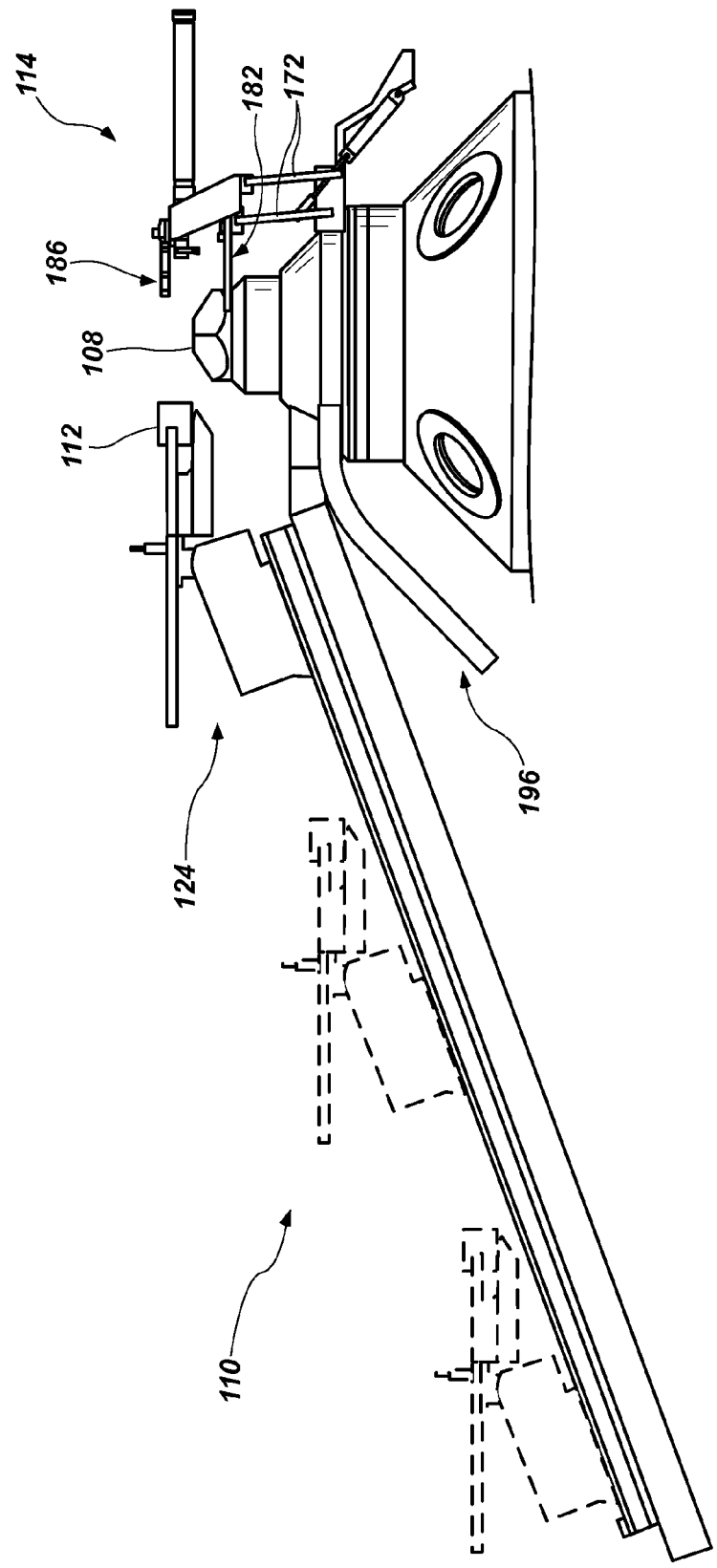
Figure 13C:
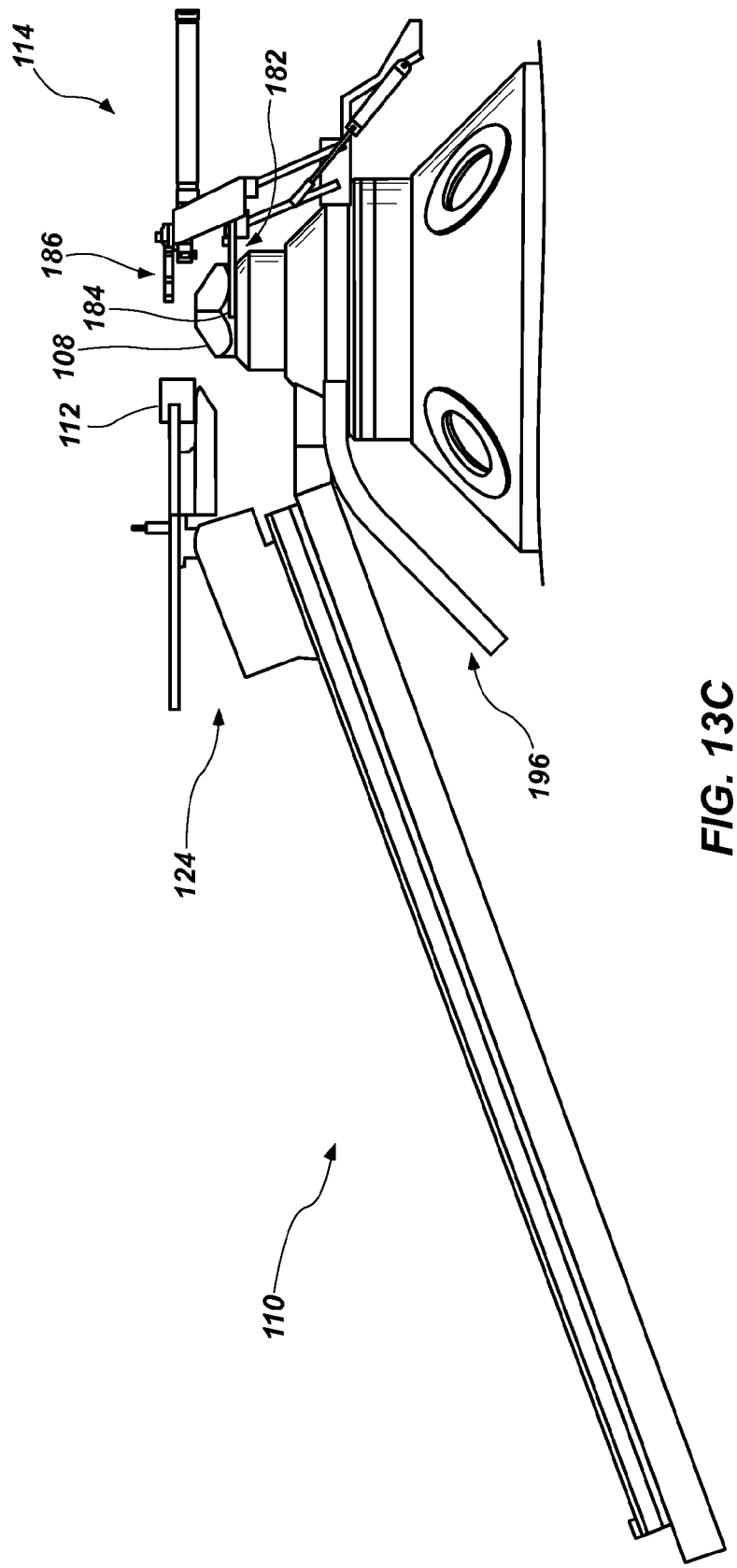

As seen in FIG. 13B, the pair of arms 174 are rotated such that the second assembly 114 is displaced toward the anvil 108 with the guide member 182 beginning to engage a peripheral surface of the anvil 108. Additionally, the trolley 124 of the first system 110 is displaced along the linear guide 122 towards the anvil 108. As seen in FIG. 13C, the second assembly 114 continues its rotation such that the arms 184 of the guide member engage the outer periphery of the anvil 108 at multiple points on the anvil 108. Engagement of the anvil 108 by the guide member 182 ensures that the positioning guide 186 of the second assembly 114 is at a desired location and orientation relative to the anvil 108.

Figure 13D:
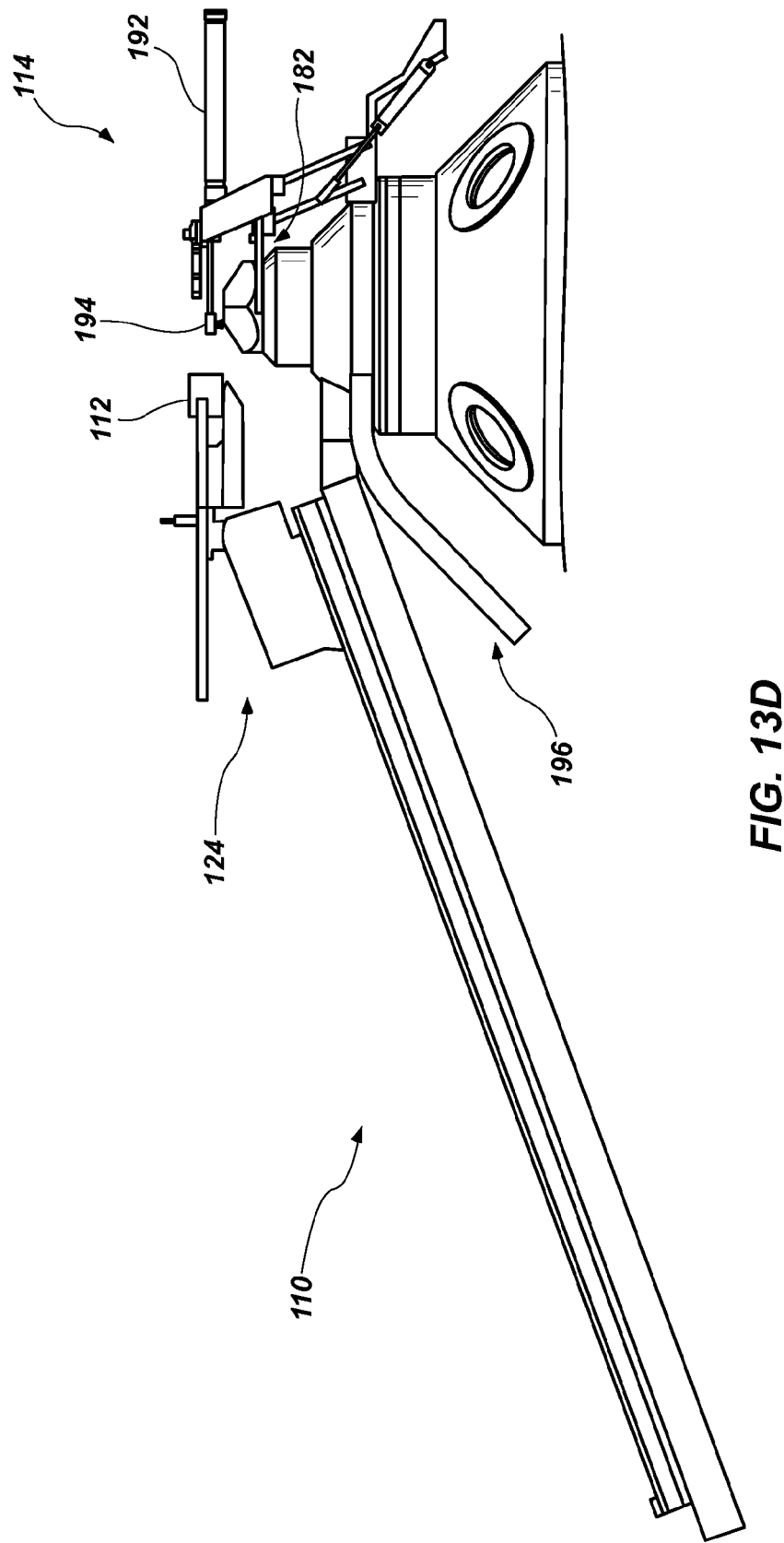

Referring to FIG. 13D, with the guide member 182 engaged with the anvil 108, the clearing mechanism 190 may be actuated with the actuator 192 displacing the sweeper 194 across the upper surface of the anvil 108. The sweeper 194 clears any debris from the anvil 108 that may be remaining from a previous HTHP process and helps to ensure that the anvil surface is clean and prepared for receipt of a new reaction cell 112.

Figure 13E:
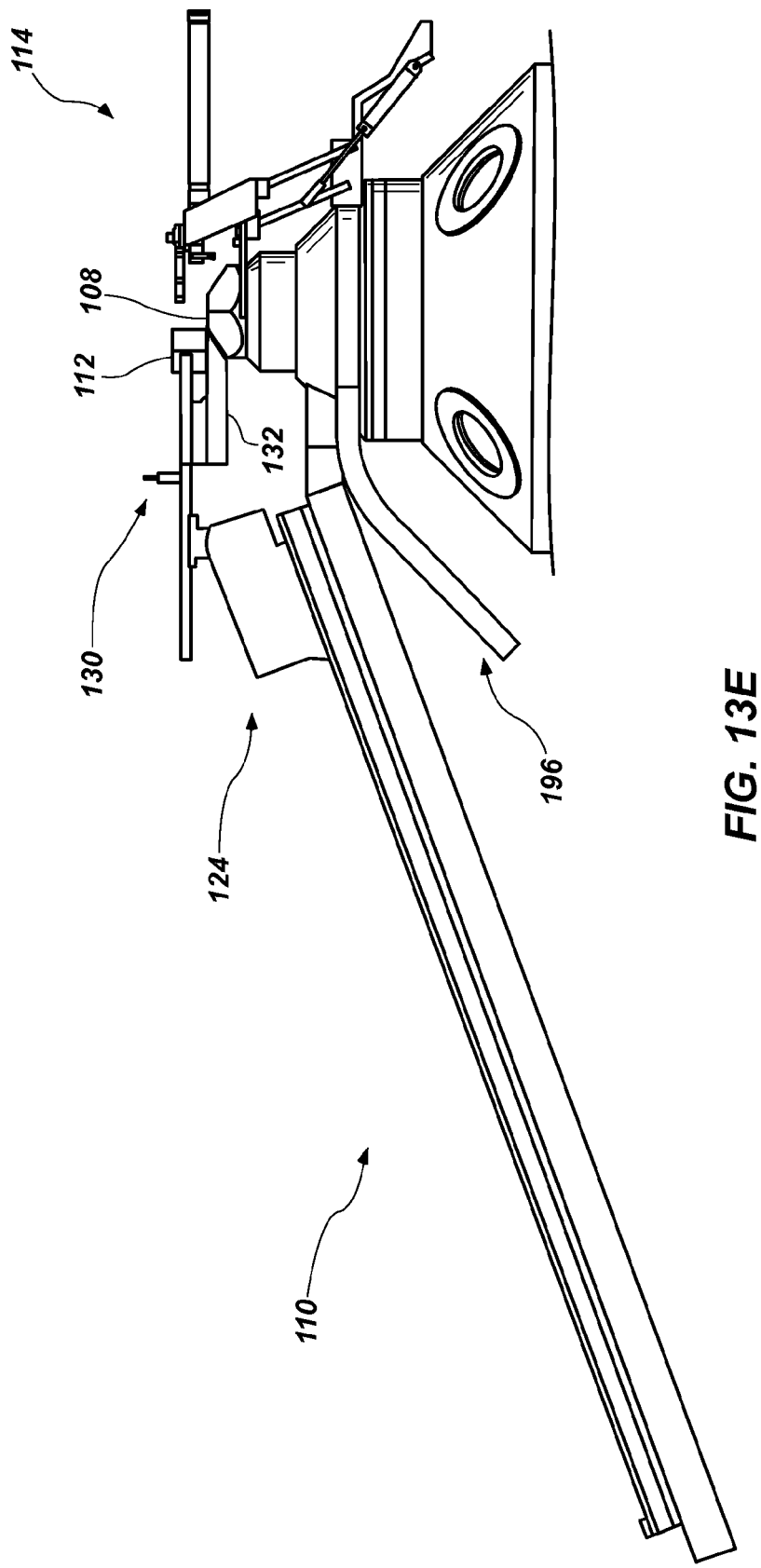

Once the surface of the anvil 108 is cleared and the sweeper 194 is retracted, the positioning mechanism 130 of the first assembly 110 may be actuated such that the base member 132 engages the anvil 108 as shown in FIG. 13E. The leading portion of the base member 132 may be configured with a geometry that is complementary with the shape of the anvil 108 such that when the base member 130 engages the anvil 108 a substantially continuous surface is formed between the two components for the reaction cell 112 to slide across. In another embodiment, if any gap exists between the upper surface of the anvil 108 and the surface of the base member 132 on which the reaction cell 112 is positioned, it is insubstantial and certainly smaller than any major dimension of the reaction cell 112 so as to ensure a smooth and seamless transfer of the reaction cell 112 from the base member 132 to the anvil 108.

Figure 13F:
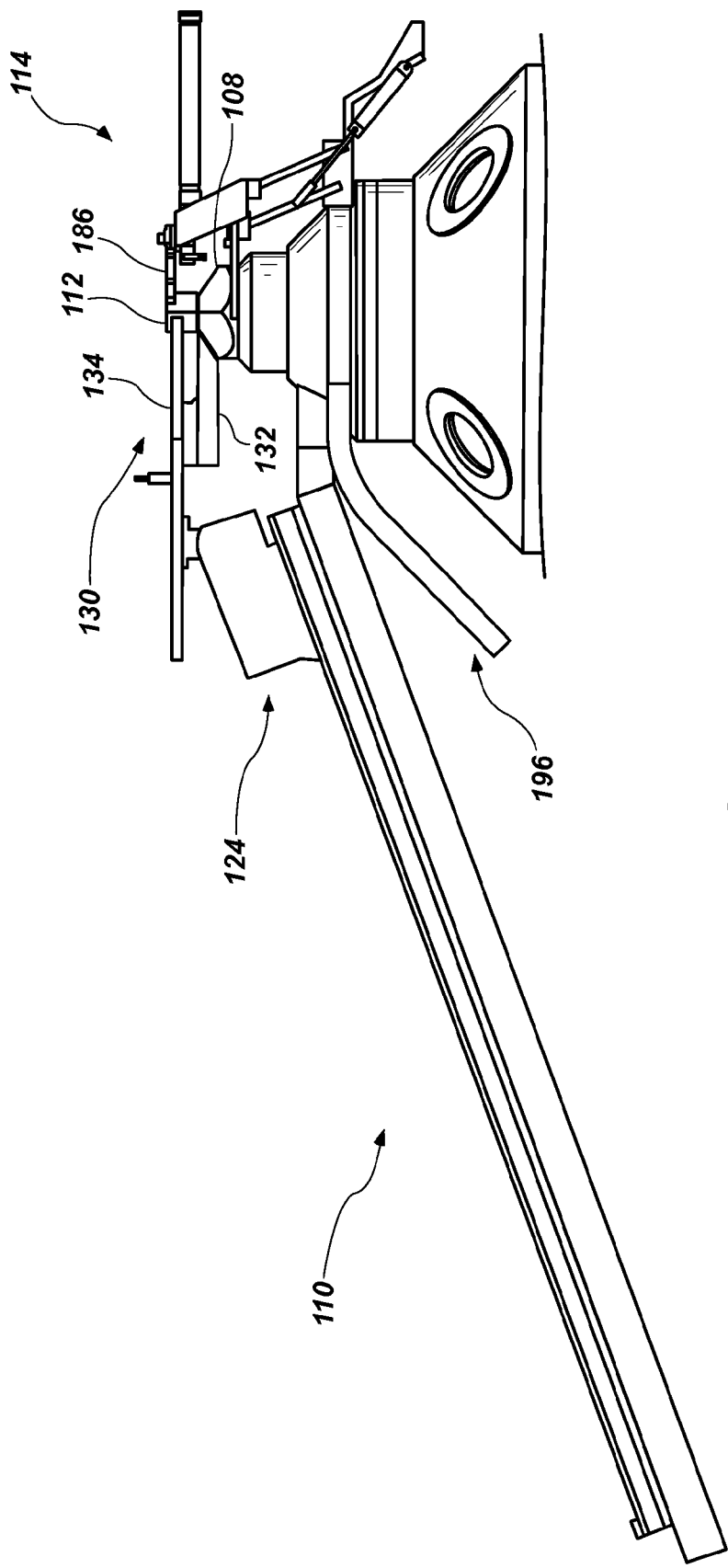

With the base member 132 engaged with the anvil 108, the guide member 134 may be displaced relative to the base member 132 causing the reaction cell to be transferred from the base member 132 to the anvil as shown in FIG. 13F. Accurate positioning of the reaction cell 112 on the anvil is accomplished using the arms 135 of the first assembly's positioning guide 134 and the arms 189 of the second assembly's positioning guide 186. The arms 135 of the first assembly's positioning guide 134 are in contact with two adjacent sides of the reaction cell 112 while the arms 189 of the second assembly's positioning guide 186 are in contact with two different adjacent sides of the reaction cell 112. With the bottom side of the reaction cell 112 resting on the anvil 108, five of the six sides of the cubic reaction cell are contacted by either the anvil 108 itself or a component of the loading system 100. This ensures proper positioning of the reaction cell 112 for the subsequent HTHP process which entails each of the six sides of the reaction cell 112 being contacted and pressed by an anvil as described above. The loading system 100 may position the reaction cell 112 within precise tolerances to assist with quality control of the HTHP process. For example, in one embodiment, the loading system 100 may place the reaction cell 112 within ±0.01 inch in any direction of a specified location. In another embodiment, the loading system 100 may place the reaction cell 112 within 0.007 inch in any direction of a specified location.

Figure 13G:
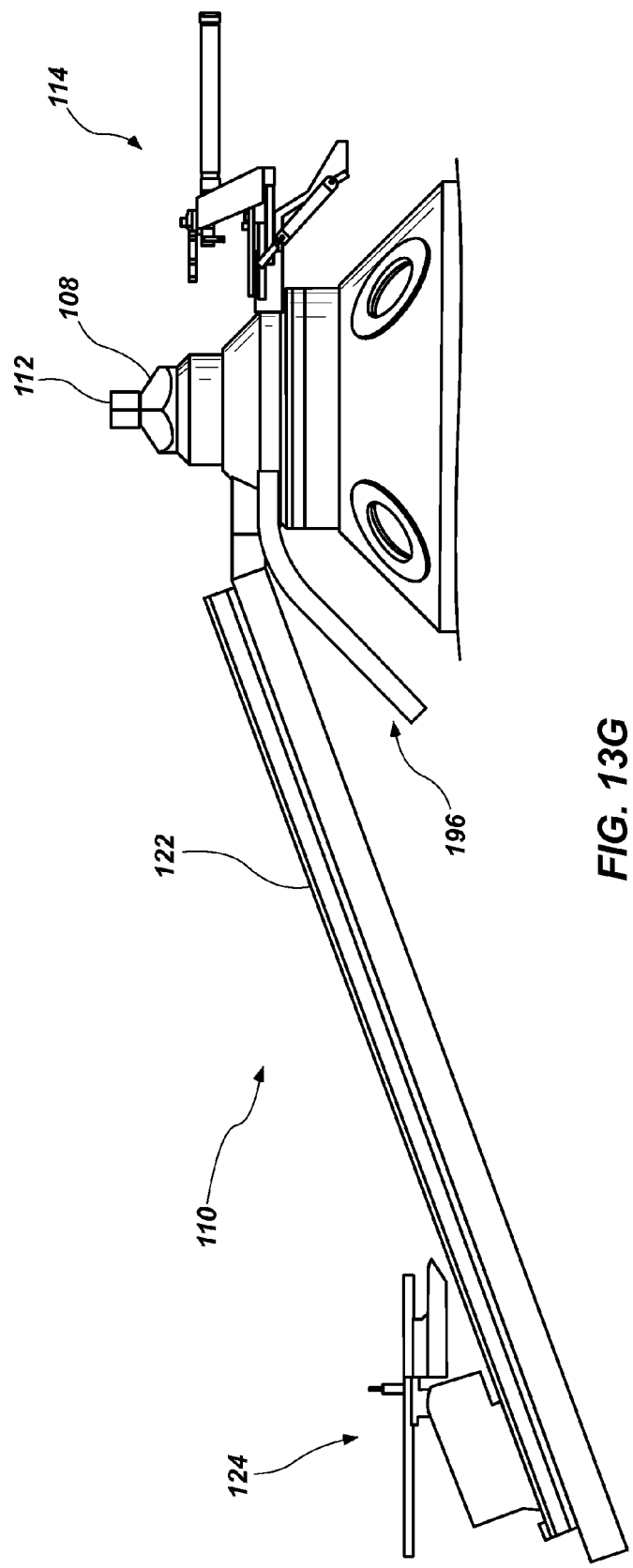
Figure 13H:
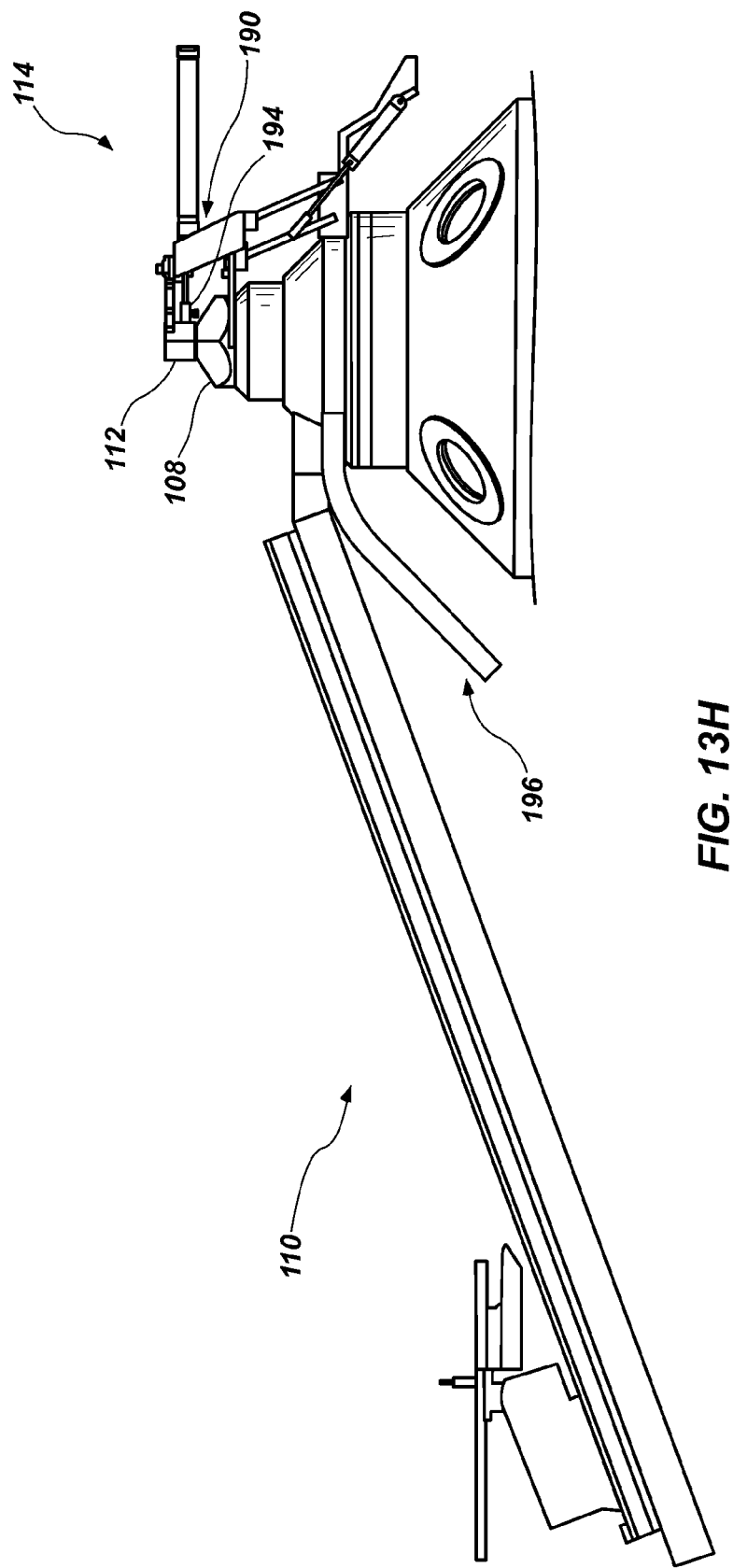
Figure 13I:
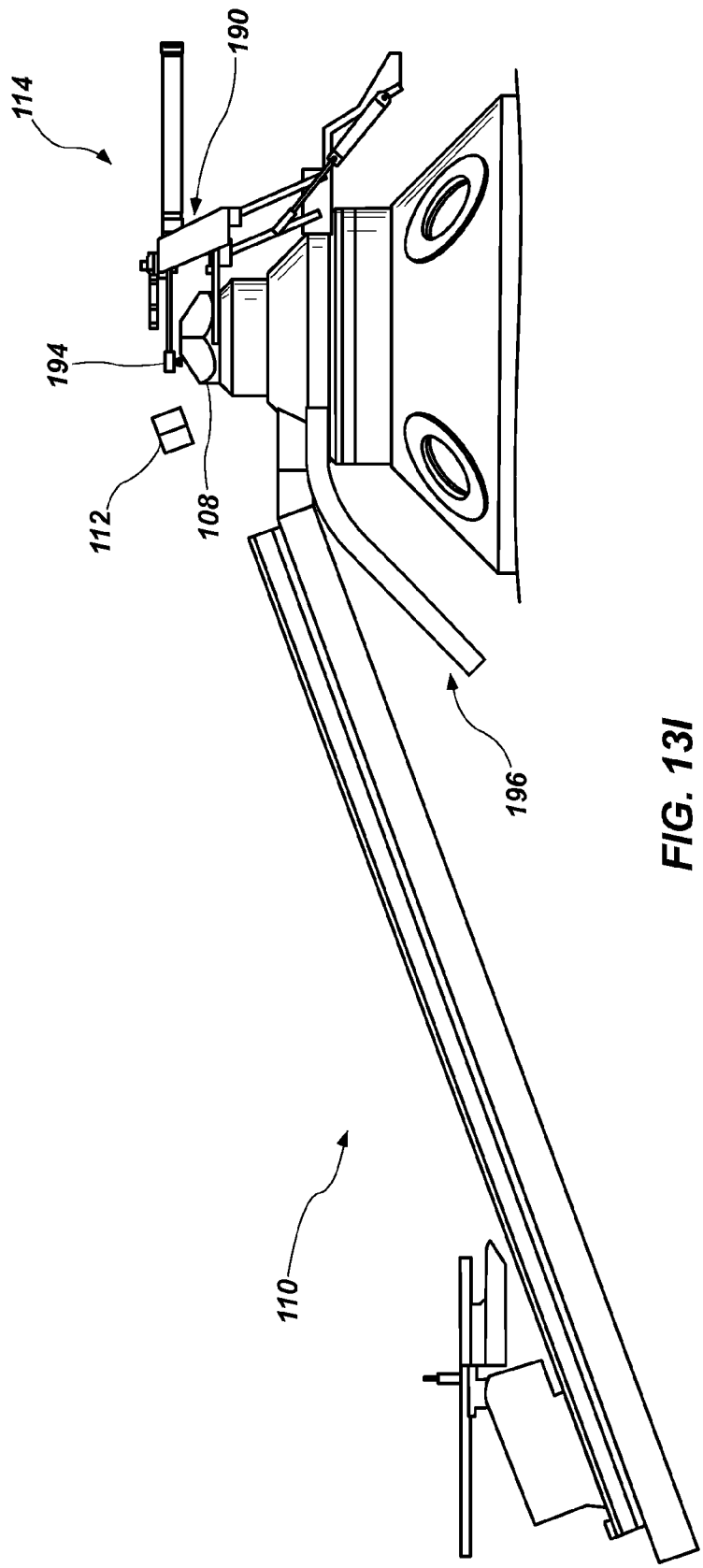

As shown in FIG. 13G, with the reaction cell 112 in a desired position on the anvil 108, the trolley 124 may be displaced down the linear guide 122 away from the anvil and the second assembly 114 may be rotated away from the anvil 108 as well. With the first assembly 110 and the second assembly 114 in these positions, the press may perform the HTHP process on the reaction cell 112 to create a polycrystalline diamond compact such as has been described above herein. Once the HTHP process has taken place, the second assembly 114 may rotate back into a position where the guide member 182 engages the anvil 108 and the positioning guide 186 engages the reaction cell 112 as shown in FIG. 13H. With the second assembly 114 in this position, the clearing mechanism 190 may be actuated again with the sweeper 194 being displaced to engage the reaction cell 112. As seen in FIG. 13I, the sweeper 194 continues across the face of the anvil 108 and pushes the reaction cell off of the anvil 108. A hopper or other collection structure may be positioned adjacent to, or about the press base 102B to collect the reaction cell 112. The process may then begin again with a new reaction cell being placed on the base member of the positioning member to be carried to and positioned on the anvil 108.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An automated loading system for a high-temperature, high-pressure (HTHP) press, the system comprising:
a first assembly comprising:
a support member;
a trolley displaceable relative to the support member;
a positioning mechanism coupled with the trolley, the positioning mechanism including a base member configured to carry a reaction cell on a portion thereof, the base member also being configured to directly engage a first portion of the HTHP press when the trolley is in a first position relative to the support member;
a second assembly comprising:
a bracket;
a body portion displaceable relative to the bracket;
an alignment guide configured to engage a second portion of the HTHP press when the body portion is in a first position relative to the bracket;
a first positioning guide configured to cooperate with the positioning mechanism of the first assembly to position a reaction cell carried by the base member of the positioning mechanism at a desired location relative to a defined component of a HTHP press.

2. The system of claim 1, wherein the first assembly further includes a rail coupled to the support member and wherein the trolley is slidably coupled with the rail.

3. The system of claim 2, wherein the positioning mechanism further comprises a second positioning guide movably coupled with the base member.

4. The system of claim 3, wherein the second positioning guide includes a pair of guide arms configured to engage a first side and a second side of a generally cubic reaction cell.

5. The system of claim 4, further comprising a first actuator configured to displace the trolley along the rail.

6. The system of claim 5, further comprising a second actuator configured to displace the second positioning guide relative to the base member.

7. The system of claim 5, wherein the first positioning guide includes a pair of guide arms configured to engage a third side and a fourth side of a generally cubic reaction cell.

8. The system of claim 7, wherein the second assembly further comprises a pair of arms pivotally coupled between the bracket and the body portion to form a multiple bar linkage.

9. The system of claim 8, further comprising a third actuator configured to displace the pair of arms between at least two different positions.

10. An automated loading system for a high-temperature, high-pressure (HTHP) press, the system comprising:
   a first assembly comprising:
      a support member;
      a trolley displaceable relative to the support member;
      a positioning mechanism coupled with the trolley configured to carry a reaction cell;
   a second assembly comprising:
      a bracket;
      a body portion displaceable relative to the bracket;
      a pair of arms pivotally coupled between the bracket and the body portion to form a multiple bar linkage:
      an alignment guide wherein the alignment guide is coupled with the multiple bar linkage and includes a pair of guide arms configured to engage a surface of a defined component of a HTHP press base;
      a first positioning guide configured to cooperate with the positioning mechanism of the first assembly to position a reaction cell carried by the positioning mechanism at a desired location relative to the defined component of a HTHP press.

11. The system of claim 6, wherein the second assembly further includes a clearing mechanism associated with the body portion.

12. The system of claim 11, wherein the clearing mechanism includes a sweeper and a fourth actuator configured to displace the sweeper between at least two positions relative to the body portion.

13. A high-temperature, high-pressure (HTHP) press comprising:
   a first press base having a piston and an anvil coupled with the piston;
   an automated loading system comprising:
   a first assembly comprising:
      a support member coupled with the first press base;
      a trolley displaceable relative to the support member;
      a positioning mechanism coupled with the trolley configured to carry a reaction cell to the anvil of the first press base;
   a second assembly comprising:
      a bracket coupled with the first press base;
      a body portion displaceable relative to the bracket;
      an alignment guide configured to be positioned relative to a surface of the anvil;
      a first positioning guide configured to cooperate with the positioning mechanism of the first assembly to position a reaction cell at a desired location on the anvil.

14. The HTHP press of claim 13, wherein the first assembly further includes a guide member coupled to the support member and wherein the trolley is slidably coupled with the guide member.

15. The HTHP press of claim 14, wherein the positioning mechanism further comprises a base member and a second positioning guide movably coupled with the base member, the second positioning guide including a pair of guide arms configured to engage a first side and a second side of a generally cubic reaction cell.

16. The HTHP press of claim 15, further comprising a first actuator configured to displace the trolley along the guide member and a second actuator configured to displace the second positioning guide relative to the base member.

17. The HTHP press of claim 16, wherein the first positioning guide includes a pair of guide arms configured to engage a third side and a fourth side of a generally cubic reaction cell.

18. The HTHP press of claim 17, wherein the second assembly further comprises a pair of arms pivotally coupled between the bracket and the body portion to form a multiple linkage and a third actuator configured to displace the pair of arms between at least two different positions.

19. The HTHP press of claim 14, wherein the second assembly further includes a clearing mechanism associated with the body portion, the clearing mechanism including a sweeper and a fourth actuator configured to displace the sweeper across a surface of the anvil.

20. The HTHP press of claim 19, further comprising a hopper associated with the first press base located and configured to collect reaction cells that have been subjected to a HTHP process by the HTHP press.

21. The HTHP press of claim 19, further comprising a second, third, fourth, fifth and sixth press base each having a piston and an anvil coupled with the piston, the first, second, third, fourth, fifth and sixth press bases being arranged as a generally cubic HTHP press.

* * * * *